(12) United States Patent
Evans et al.

(10) Patent No.: US 10,942,324 B2
(45) Date of Patent: Mar. 9, 2021

(54) INTEGRATED ELECTRICAL AND OPTOELECTRONIC PACKAGE

(71) Applicant: CORNING OPTICAL COMMUNICATIONS LLC, Charlotte, NC (US)

(72) Inventors: Alan Frank Evans, Beaver Dams, NY (US); Andreas Matiss, Berlin (DE); Michael Wimmer, Berlin (DE)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

(21) Appl. No.: 16/553,893

(22) Filed: Aug. 28, 2019

(65) Prior Publication Data
US 2019/0391350 A1    Dec. 26, 2019

Related U.S. Application Data

(63) Continuation of application No. PCT/US2018/020907, filed on Mar. 5, 2018.
(Continued)

(51) Int. Cl.
G02B 6/42 (2006.01)
G02B 6/38 (2006.01)

(52) U.S. Cl.
CPC ......... *G02B 6/4292* (2013.01); *G02B 6/3825* (2013.01); *G02B 6/3869* (2013.01);
(Continued)

(58) Field of Classification Search
CPC .... G02B 6/3869; G02B 6/423; G02B 6/4245; G02B 6/4259
See application file for complete search history.

(56) References Cited

U.S. PATENT DOCUMENTS

| 7,693,360 B2 | 4/2010 | Shimizu et al. |
| 7,729,581 B2 | 6/2010 | Rolston et al. |

(Continued)

FOREIGN PATENT DOCUMENTS

| GB | 2512379 A | 10/2014 |
| JP | 2007057976 A | 3/2007 |

(Continued)

OTHER PUBLICATIONS

International Search Report and Written Opinion of the International Searching Authority; PCT/US2018/020907; dated Jul. 30, 2018; 16 Pages; European Patent Office.

*Primary Examiner* — Sung H Pak
(74) *Attorney, Agent, or Firm* — Grant A. Gildehaus

(57) ABSTRACT

An integrated electrical and optoelectronic package comprises an optical subassembly for the conversion of data between an optical and electrical format, an electronic chip including an integrated electric circuit for processing the data in the electrical format and an interposer. The interposer is configured as a supporting substrate to support the optical subassembly and the electronic chip. An optical connector may be coupled to the package. The optical subassembly comprises an optical adaptor used as an interface between a ferrule of the optical connector and an optoelectronic chip of the optical subassembly. Optical fibers of the optical cable are aligned to optical waveguides of the optoelectronic chip by at least one alignment pin of the optical adaptor.

28 Claims, 30 Drawing Sheets

Related U.S. Application Data

(60) Provisional application No. 62/467,969, filed on Mar. 7, 2017.

(52) U.S. Cl.
CPC ........... *G02B 6/423* (2013.01); *G02B 6/4245* (2013.01); *G02B 6/4259* (2013.01)

(56) References Cited

U.S. PATENT DOCUMENTS

| | | |
|---|---|---|
| 8,867,869 B2 | 10/2014 | Steijer et al. |
| 9,297,971 B2 * | 3/2016 | Thacker ............... H01L 25/0655 |
| 9,335,500 B2 | 5/2016 | McLaren et al. |
| 9,343,450 B2 * | 5/2016 | Shastri ................. G02B 6/4249 |
| 9,618,702 B2 | 4/2017 | Takano et al. |
| 2003/0031431 A1 * | 2/2003 | Kunkel ................. G02B 6/4292 385/92 |
| 2003/0201462 A1 | 10/2003 | Pommer et al. |
| 2005/0063634 A1 | 3/2005 | Cohen et al. |
| 2015/0063760 A1 | 3/2015 | Pommer et al. |
| 2015/0145086 A1 | 5/2015 | Rokuhara et al. |
| 2016/0085038 A1 * | 3/2016 | Decker ................. G02B 6/428 385/14 |
| 2016/0216445 A1 | 7/2016 | Thacker et al. |
| 2019/0129112 A1 | 5/2019 | Matiss |
| 2019/0384007 A1 * | 12/2019 | Matiss ................. G02B 6/4292 |

FOREIGN PATENT DOCUMENTS

| | | |
|---|---|---|
| JP | 2008091503 A | 4/2008 |
| WO | 2018165061 A1 | 9/2018 |

\* cited by examiner

INTEGRATED ELECTRICAL AND OPTOELECTRONIC PACKAGE

PRIORITY APPLICATIONS

This application is a continuation of International Application No. PCT/US18/20907, filed on Mar. 5, 2018, which claims the benefit of priority to U.S. Application No. 62/467,969, filed on Mar. 7, 2017, both applications being incorporated herein by reference.

FIELD

The disclosure relates to an integrated electrical and optoelectronic package and components thereof, such as an optical subassembly for the conversion of data between an optical and electrical format, a receptacle housing to house the optical subassembly and an optical connector terminating an optical cable to be coupled to the integrated electrical and optoelectronic package.

BACKGROUND

An increasing number of applications use optical signals for the transmission of data. An optical fiber of an optical cable is capable of transmitting data signals having an extremely large amount of bandwidth compared with a conductor of a copper cable. In order to process the transferred data signals, the optical signals have to be converted into electrical signals which may be processed by an integrated electronic circuit.

For this purpose, on-board mounted optoelectronic converters, also known as mid-board optical transceivers, embedded optical modules or co-packaged, multi-chip modules are used. The optoelectronic chips may be mounted to a printed circuit board and may be connected via electrical transmission lines over the printed circuit board to a high speed electronic IC package that may typically be embodied in a BGA (Ball Grid Array) style.

This technology is well-suited until the capacity limit of electrical bandwidths and the maximum amount of electrical input/output terminals that typically fit into a BGA package are exceeded. It can be expected that this electrical bottleneck will occur with the next generation of switch ASICs in data center applications operating, for example, at 12.6 Terabit per second. For these speeds and beyond, a migration of optical converters on the same substrate where the switch ASIC resides is foreseen.

There is an unresolved need to provide an integrated electrical and optoelectronic package to process data signals, wherein the package may be coupled to an optical communication network transmitting optical signals via optical cables with a high bandwidth and wherein the data has to be processed by the package with a high speed. A further desire is to provide components of the integrated electrical and optoelectronic package that are suited for transferring and/or processing data with high speed, wherein the components of the integrated electrical and optoelectronic package may be assembled by standard IC packaging techniques, such as a standard IC reflow soldering process.

SUMMARY

One aspect of the disclosure is directed to an integrated electrical and optoelectronic package for operating data with high speed that may be coupled to an optical communication network.

The package may comprises an optical subassembly for the conversion of data between an optical and electrical format and an electronic chip including an electric integrated circuit for processing the data in the electrical format. The package further comprises an interposer being configured as a supporting substrate to support the optical subassembly and the electronic chip. The interposer is configured to provide data transmissions paths for the transmission of the data in the electrical format between the optical subassembly and the electronic chip. The electric integrated circuit is electrically connected to the interposer.

Another aspect of the disclosure is directed to an optical subassembly for the conversion of data between an optical and electrical format.

The optical subassembly has a first side to transmit and receive the data in the optical format and a second side to transmit and receive the data in the electrical format. The optical subassembly comprises an optoelectronic chip to change the data format of the data between the optical and electrical format and a spacer substrate comprising metallized through-glass-vias. The optoelectronic chip comprises optical waveguides.

The optical subassembly may further comprises a spacer substrate having a top side to mount the optoelectronic chip onto the spacer substrate and having a bottom side to be mountable to a supporting substrate. The bottom side of the spacer substrate is configured as the second side of the optical subassembly. The spacer substrate is configured to provide the optoelectronic chip in a distance to the supporting substrate, when the optical subassembly is mounted to the supporting substrate.

The optoelectronic chip includes an opto-electrical converter circuit, for example, a photonic integrated circuit or an optoelectronic integrated circuit. The optoelectronic chip/opto-electrical converter is electrically connected to the integrated electric circuit through the interposer. The interposer may comprise alignment features which could be holes and/or cut-out regions provided in the material of the interposer, for example at the edge of the interposer, which position the optical subassembly adjacent to the electric integrated circuit. The interposer may be transparent to UV-light to allow it to pass through for curing an adhesive, for example an epoxy, used for fixing the different components of the package to the interposer. According to a particular embodiment, the interposer may be made from glass or glass ceramic.

The optoelectronic converter circuit is configured to convert data from the optical to the electrical format and vice versa. The optoelectronic chip/the optoelectronic converter circuit is connected to the data transmission paths of the interposer, for example electrical conductors of the interposer, to transfer data in the electrical format between the electric integrated circuit and the optoelectronic chip/the opto-electronic converter. That means that in order to transfer the data between an optical cable of an optical communication network and the electric integrated circuit of the integrated electrical and optoelectronic package, it is not necessary to pass light through the interposer.

The spacer substrate may be made from glass or a glass ceramic. According to another embodiment, in particular, when the optoelectronic chip is flip-chip mounted on the spacer substrate, the spacer substrate may be embodied as a glass transposer including metallized through-glass vias to provide electrical transmission paths between the electrical conductors of the interposer and the optoelectronic chip. The optical subassembly may comprise an optical adaptor for transferring light between optical fibers of an optical cable and the optoelectronic chip. The optical adaptor comprises optical waveguides for transferring light between the optical fibers of the optical cable and the optoelectronic chip. The optical adaptor further comprises at least one alignment pin. The spacer substrate may comprise at least one cavity to receive the at least one alignment pin to optically couple the optical waveguides of the optical adaptor to the optical waveguides of the optoelectronic chip so that the optical waveguides of the adaptor and the optical waveguides of the optoelectronic chip are aligned to each other to transfer light with low loss.

Still another aspect of the disclosure is directed to a receptacle housing to house the optical subassembly and an optical connector.

The receptacle housing comprises a body having a tunnel to receive the optical connector at a first side of the tunnel and to receive an optical adaptor of the optical subassembly as an interface between the optoelectronic chip and the optical connector at a second side of the tunnel. The body of the receptacle housing has at least one slot for passing at least one alignment pin of the optical adaptor therethrough for aligning the optical adaptor and the optical connector in the tunnel.

Another aspect of the disclosure is directed to an optical connector terminating an optical cable to be coupled to the integrated electrical and optoelectronic package. The optical connector comprises a connector body comprising at least one guiding slot and a ferrule having channels being configured to receive a respective optical fiber of the optical cable. The ferrule comprises at least one protrusion. The optical connector comprises a spring element being coupled to the ferrule. The ferrule is arranged in the connector body such that the at least one protrusion is movably arranged in the at least one guiding slot of the connector body.

The spring element is configured to exert a force to the ferrule such that the ferrule is pushed against the optical subassembly of the integrated electrical and optoelectronic package. The at least one protrusion of the ferrule is guided within the guiding slot of the connector body, when the optical connector is coupled to the integrated electrical and optoelectronic package and the ferrule is moved in the body of the optical connector to be pressed against the optical subassembly. When the optical connector is pressed against the optical adaptor of the optical subassembly the at least one alignment pin enters a cavity of the ferrule. The at least one alignment pin enables an exact alignment between the optical waveguides of the optical adaptor and the optical fibers of the optical cable.

Many components of the integrated electrical and optoelectronic package, in particular the interposer, but also portions of the optical subassembly, for example the spacer substrate/the transposer as well the optical adaptor may be made from glass or glass ceramic. Glass-based technologies offer a couple of significant advantages over other material systems.

Glass has a low CTE (coefficient of thermal expansion) matched to silicon integrated circuits and optical waveguides such as fibers improving optical alignment over wide temperature ranges. In particular Corning® Eagle XG® with a CTE of 3.17 ppm/° C. is well matched to silicon with a CTE of 2.59 ppm/° C. In some applications, it is desired to have the glass interposer be an intermediate value between the silicon and the PCB material. In this case, Corning® Gorilla® Glass 4 with a CTE of 8.69 ppm/° C. works well with the standard PCB material, for example FR4 with a CTE of 12-14 ppm/° C. (within the plane of the material).

Glass can be processed in panel form allowing for increased area co-packaged assemblies and also lower costs compared to wafer based platform technologies. Sheet may be formed in sizes up to 2940×3370 mm (Gen 10.5), laser cut samples in sizes up to 1500×1850 mm, and glass vias (holes) may be created in sizes up to 508×508 mm.

Glass can be easily modified with laser cutting into any arbitrary 2.5D shape to realize mechanical features for connectorization. Furthermore, glass is an excellent dielectric material suited for lowest electrical losses at highest frequencies. Glass is optically transparent for vision-based alignment and UV curing which can occur from beneath the assembly so there is no interference from silicon, metal or other opaque objects.

Glass has excellent dimensional stability, low warp and low bow. This is important for when a high density ball grid array is used to connect electronic ICs to the interposer. Glass potentially can include optical waveguides such as with silver ion-exchange as it is transparent and low loss in the near IR.

Glass can be formed in a variety of thicknesses and has a higher elastic modulus than standard PCB polymer-based resins providing stiffness and toughness for mechanical optical alignment elements like receptacles. Further, glass can be further strengthened via a ion-exchange processes such as used for Corning® Gorilla® Glass or the like.

Glass can also provide thermal isolation between the electronic IC and the more temperature sensitive photonic IC. A glass interposer is fully compliant to reflow solder techniques changing the technology from expensive post-assembly fiber attached to pre-solder connectorization.

The co-packaged electronic chip, for example, an ASIC, together with the other components, such as the optical subassembly with the optoelectronic chip and the optical adaptor, and the receptacle housing mounted on the interposer allow for low-power and low-cost connectorization.

DETAILED DESCRIPTION

Figure 1:
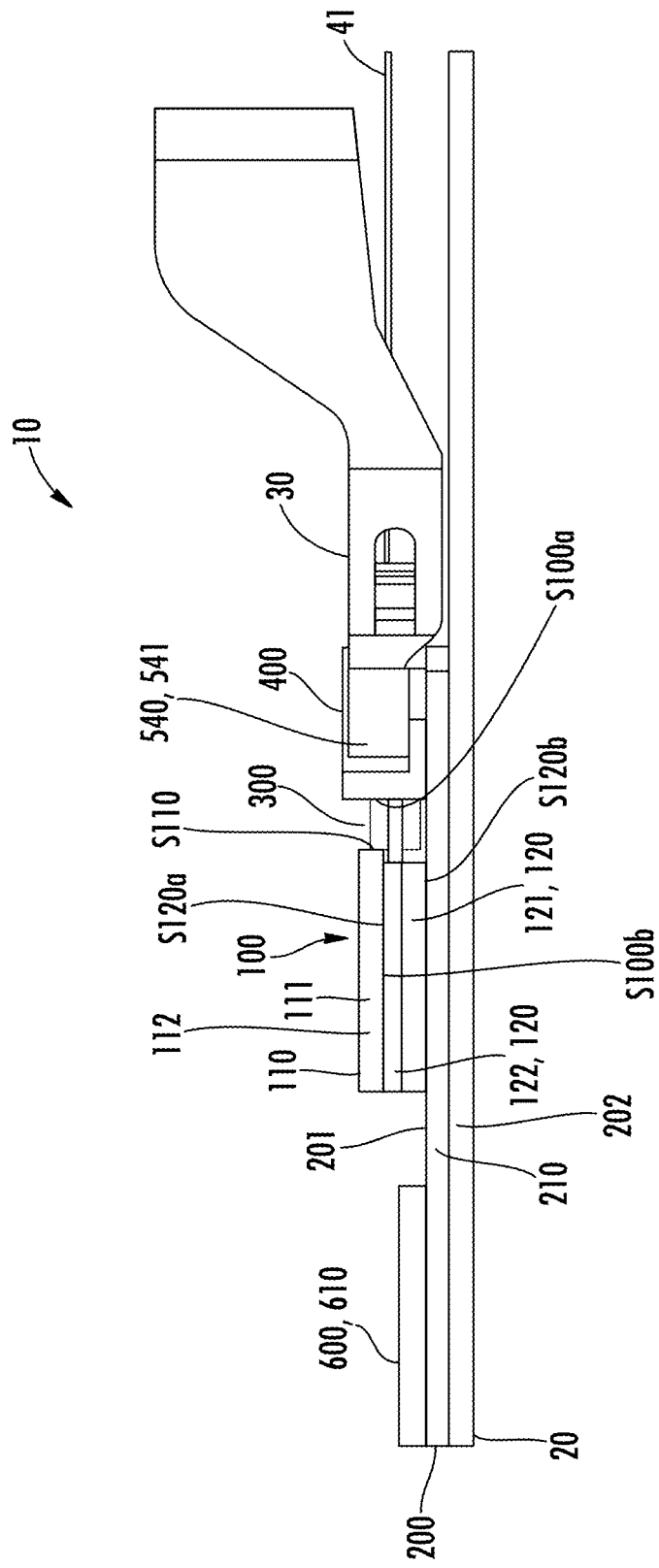
FIG. 1 shows a side view of an integrated electrical and optoelectronic package.

Embodiments of the integrated electrical and optoelectronic package and its components will now be described more fully hereinafter with reference to the accompanying drawings. The integrated electrical and optoelectronic package as well as its components may, however, be embodied in many different forms and should not be construed as limited to the embodiments set forth herein; rather, these embodiments are provided so that the disclosure will fully convey the scope of the package and its components to those skilled in the art. The drawing are not necessarily drawn to scale but are configured to clearly illustrate the different embodiments of the integrated electrical and optoelectronic package and its components.

Figure 2:
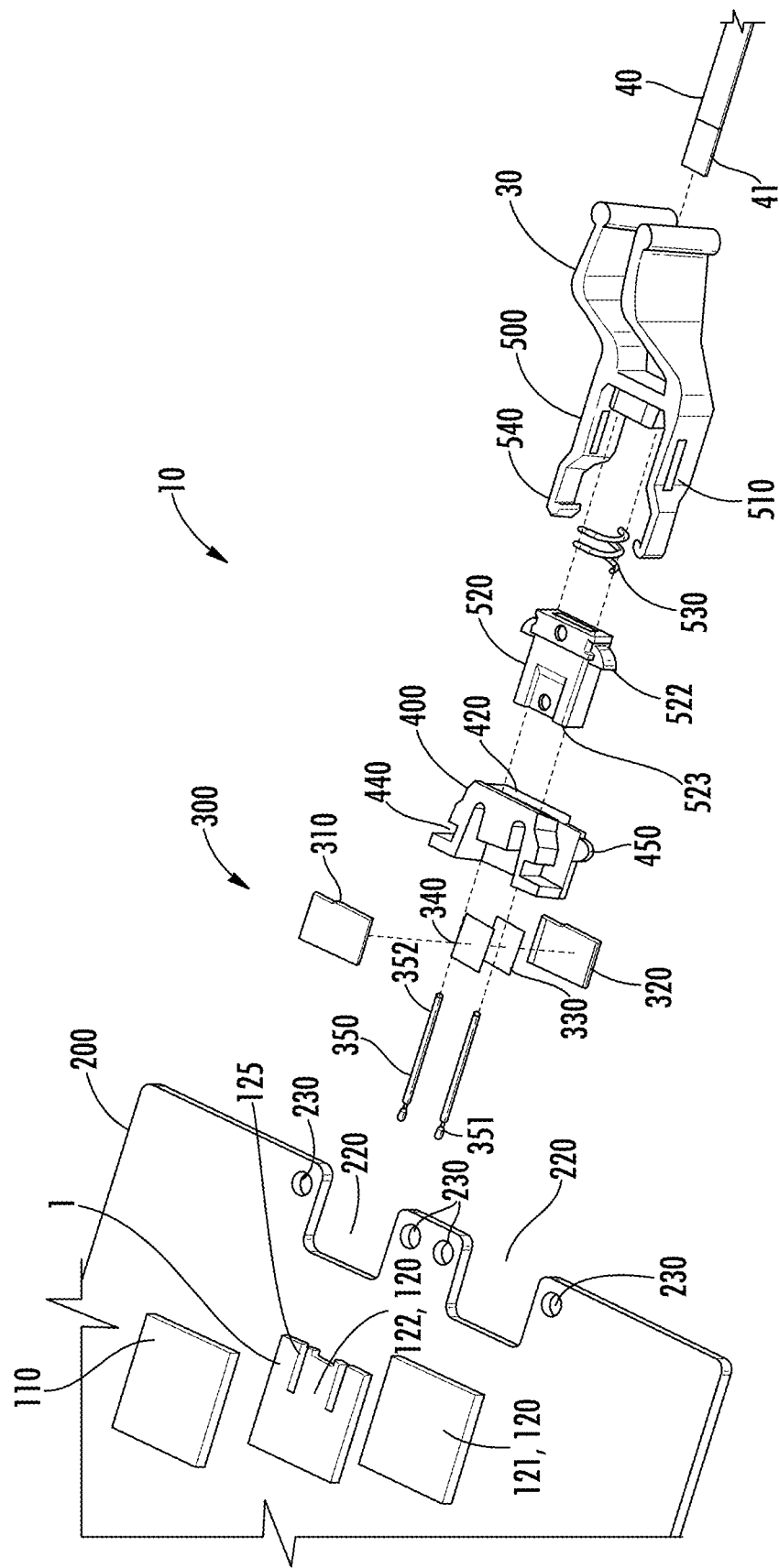
FIG. 2 shows an exploded view of components of an integrated electrical and optoelectronic package.

FIGS. 1 and 2 show an integrated electrical and optoelectronic package 10 in a side view and an exploded view. The package 10 enables a data processing of optical data received via optical fibers 41 of an optical cable. To enable a simplified illustration, FIG. 1 only shows a single optical fiber 41 of the optical cable, but the concepts may use a plurality of optical fibers/optical waveguides. The optical cable 40 is shown in FIG. 2. The package 10 comprises an optical subassembly 100 for the conversion of data between an optical and an electrical format. The package further comprises a receptacle housing 400 being configured to couple the optical subassembly 100 to an optical connector 30 terminating the optical cable 40. The integrated electrical and optoelectronic package 10 further comprises an electronic chip 600, for example an ASIC, including an integrated electric circuit for processing the data in the electrical format. The data are received by the integrated electrical and optoelectronic package from the optical cable or will be transmitted from the package via the optical cable to an optical communication network.

The integrated electrical and optoelectronic package 10 further comprises an interposer 200 being configured as a supporting substrate to support the optical subassembly 100 and the electronic chip 600. The interposer 200 is configured to provide data transmission paths 210 for the transmission of the data in the electrical format between the optical subassembly 100 and the electronic chip 600. The data transmission path 210 can be arranged on an upper surface 201 or a lower surface 202 of the interposer 200, or can be arranged within the interposer 200.

The optical subassembly 100 has a first side S100a to transmit and receive the data in the optical format and a second side S100b to transmit and receive the data in the electrical format. The optical subassembly 100 comprises an optoelectronic chip 110 that includes an opto-electrical converter circuit 112 to change a data format of the data between the optical and electrical format. The optoelectronic chip 110 comprises optical waveguides 111. The subassembly may also include other components as desired.

By way of example, the optical subassembly 100 may comprise a spacer substrate 120 having a top side S120a to mount the optoelectronic chip 110 onto the spacer substrate 120. The spacer substrate 120 has a bottom side S120b to be mountable to the interposer 200. The bottom side S120b of the spacer substrate 120 is configured as the second side S100b of the optical subassembly 100. That means that data are transmitted and received in the electrical format by the optical subassembly at the bottom side S120b of the spacer substrate 120.

As shown in FIG. 1, the spacer substrate 120 is configured for providing the optoelectronic chip 110 at a distance to the interposer 200. The optical subassembly 100 is arranged on the upper side 201 of the interposer 200. The optical subassembly 100 may be fixed to the upper surface 201 of the interposer 200 by an adhesive layer arranged between the bottom side S120b of the spacer substrate 120 and the upper surface 201 of the interposer 200.

The optical cable 40 is terminated by an optical connector 30. The optical connector 30 comprises a connector body 500, a ferrule 520 and a spring element 530. In a mated condition the ferrule 520 is movably arranged at the connector body 500. For this purpose, the ferrule 520 comprises at least one protrusion 522 which is movably arranged in at least one guiding slot 510 of the connector body 500. A rearward end of the ferrule 520 is supported at the connector body 500 by means of the spring element 530.

The optical subassembly 100 comprises an optical adaptor 300 that is configured as an interface between the ferrule 520 of the optical connector 30 and the optoelectronic chip 110. The optical adaptor 300 comprises a plurality of short optical waveguides 340 which are arranged in grooves of a glass plate 310. Optical waveguides 340 may be any suitable waveguide as desired such as a planar waveguide formed by laser or ion exchange process, optical fibers or other suitable optical waveguides. As an explanatory example, optical waveguides are described in this embodiment are optical fibers, but other variations of the optical adaptor 300 are possible. In this embodiment, the optical waveguides 340 are fixed within the grooves of the glass plate 310 by means of a glass plate 330 that is arranged below the grooves of the glass plate 310.

The optical adaptor 300 is arranged in front of the optoelectronic chip 110. In order to align the optical waveguides 340 of the optical adaptor 300 to the optical waveguides 111 of the optoelectronic chip 110, it is necessary to align the arrangement of the optoelectronic chip 110 and the optical adaptor 300. The optical adaptor 300 comprises at least one alignment pin 350. The alignment pin 350 may be arranged between the glass plate 310 and the glass plate 320 of the optical adaptor. In the mated state of the optical subassembly, an end portion 351 of the at least one alignment pin 350 is inserted in at least one cavity 125 of the spacer substrate 120. The at least one cavity 125 and the at least one alignment pin 350 are formed such that, in the mated state, the optical waveguides 340 of the optical adaptor 300 are aligned to the waveguides 111 of the optoelectronic chip 110 so that light may be transferred between the optical waveguides 340 and the optical waveguides 111 with low loss.

According to a possible embodiment, the respective front faces of the optical waveguides 111 of the optoelectronic chip 110 may terminate at a side face S110 of the optoelectronic chip 110. A direct coupling between the optical waveguides 340 of the optical adaptor and the optical waveguides 111 of the optoelectronic chip can be provided by a physical contact between a respective front side of the optical waveguides 340 and a respective front face of the optical waveguides 111. Other coupling techniques between the optical waveguides 340 and the optical waveguides 111 are possible, for example an evanescent coupling of light or a coupling of light between the optical waveguides 340 and the optical waveguides 111 by using an optical mirror. For these coupling techniques it is not mandatory that the optical waveguides end at the side face S110 of the optoelectronic chip 110.

The integrated electrical and optoelectronic package 10 comprises a receptacle housing 400 for housing the optical subassembly 100, for example the optical adaptor, and the ferrule 520 of the optical connector 30. In the assembled configuration of the integrated electrical and optoelectronic package 10, the receptacle housing 400 is arranged in cut-out regions 220 of the interposer 200. In particular, the receptacle housing 400 is secured to the interposer 200 by a pin-hole connection. For this purpose, pins 450 of the receptacle housing 400 are inserted in holes 230 of the interposer 200. The receptacle housing 400 comprise a tunnel 420 to receive the optical connector 30 and the optical adaptor 300. After having secured the receptacle housing 400 at the interposer 200, the optical subassembly 100 is placed on the interposer 200 and the optical adaptor is received in the tunnel 420 of the receptacle housing 400.

The interposer 200 with the optical subassembly 100 and the receptacle housing 400 mounted thereon may be arranged on a printed circuit board 20. The printed circuit board 20 may include other components for data processing not shown in FIG. 1. The interposer 200 may comprise metallized vias, for example metallized through-glass vias, to transfer signals between the electronic chip 600 and the electric components mounted on the printed circuit board 20.

The receptacle housing 400 comprises an engagement structure 440 to receive an engagement element 540 of the optical connector 30. In a mated configuration shown in FIG. 1, the engagement element 540 of the optical connector 30 is engaged in the engagement structure 440 of the receptacle housing 400.

In order to align the optical fibers 41 of the optical cable 40 to the optical waveguides 340 of the optical adaptor 300, it is necessary to align the ferrule 520 of the optical connector to the optical waveguides 340 of the optical adaptor 300 so that light is coupled between the optical fibers 41 of the optical cable and the optical waveguides 340 of the optoelectronic chip 110 with low loss. The exact optical alignment is performed by the at least one alignment pin 350 of the optical adaptor 300. When the optical adaptor 300 is arranged within the tunnel 420 of the receptacle housing 400 and the optical connector 30 is inserted in the tunnel 420, the portion 352 of the alignment pin 350 is received in the cavity 523 of the ferrule 520 so that the optical waveguides 340 of the optical adaptor 300 and the optical fibers 41 of the optical cable 40 which terminate at an end of the ferrule 520 are aligned to each other for coupling light there between with low loss.

Details of the integrated electrical and optoelectronic package 10 as well as details of the optical connector 30 are illustrated in the subsequent figures.

Figure 3:
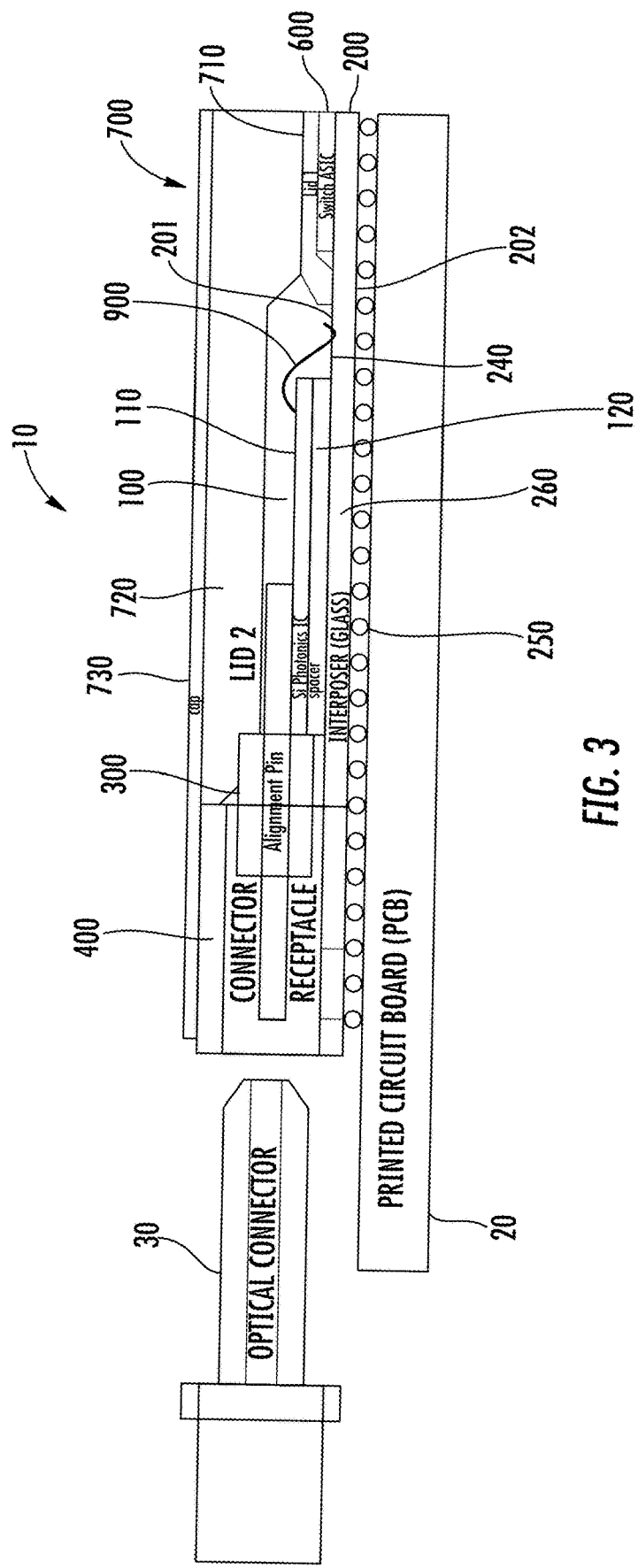
FIG. 3 shows a cross-sectional view of an integrated electrical and optoelectronic package with an optical connector to be connected to the package.
Figure 4:
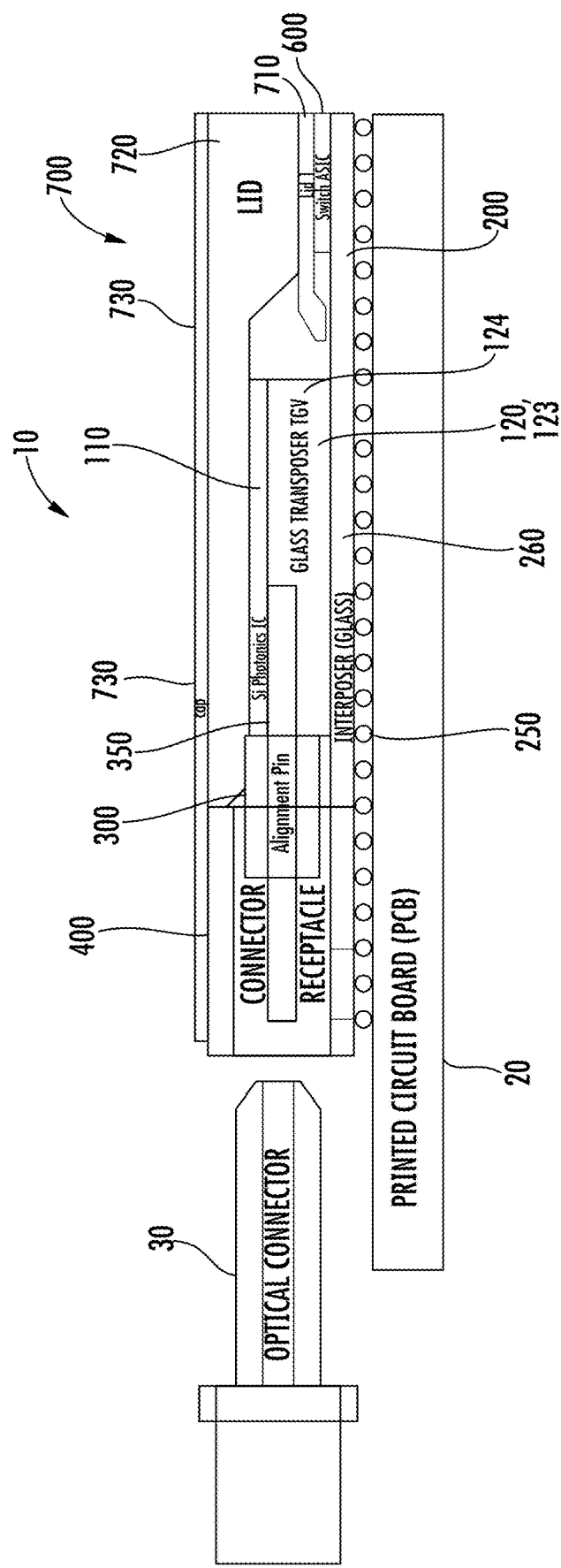
FIG. 4 shows a cross-sectional view of another embodiment of an integrated electrical and optoelectronic package with an optical connector.

FIGS. 3 and 4 show a first and a second embodiment of an integrated electrical and optoelectronic package 10 comprising the (photonic) interposer 200 that is used as a supporting substrate to support the optical subassembly 100, the receptacle housing 300 and the electronic chip 600. The interposer 200 may be configured as a glass interposer for co-packaging the electronic chip 600, for example a high-speed ASIC, which is typically situated in the middle of the interposer, a certain number of optical subassemblies 100 co-mounted on the interposer 200 as the electronic chip 600, and a respective number of receptacle housings 400 allowing to connect the fiber optical connector 30 to the photonic interposer assembly 10.

The interposer 200 provides electrical connectivity between the individual components assembled on the interposer as well as electrical connectivity to the printed circuit board 20 arranged underneath. A certain number of metal redistribution layers may be arranged on both sides 201 and 202 of the interposer 200. In order to provide an electrical conductivity between the components arranged on the top surface 201 of the interposer 200 and the components of the printed circuit board 20, electrically conductive through-glass vias 260 are provided in the interposer 200. The interposer 200 can be made from glass or glass ceramic. In this case, the interposer may comprise metallized glass-through vias 260.

In order to provide an electrical conductivity between the optoelectronic chip 110 of the optical subassembly 100 and the electronic chip 600, the interposer 200 may comprise a conductive layer 240 to provide data transmission paths 210 for the transmission of data in the electrical format between the optoelectronic chip 110 and the electronic chip 600. According to the embodiment of the integrated electrical and optoelectronic package 10 shown in FIG. 3, the optoelectronic chip 110 is arranged on the top side S120a of the spacer substrate 120. The bottom side S120b of the spacer substrate 120 is fixed to the interposer 200. An adhesive layer may be provided between the interposer 200 and the spacer substrate 120 to fix the stack of the optical subassembly 100 on top of the interposer 200. FIG. 3 shows an embodiment, where the optoelectronic chip 110 is wire-bonded by means of a wire 900 to the conductive layer 240 of the interposer 200.

The interposer 200 is electrically and mechanically connected to the printed circuit board 20 by means of connection elements 250 that are arranged between the bottom surface 202 of the interposer 200 and the printed circuit board 20.

The integrated electrical and optoelectronic package 10 comprises a covering element 700 that is arranged above the electronic chip 600 and the optical subassembly 100 as well as above the receptacle housing 400. The covering element 700 may comprise lids 710 and 720 as well as a cap 730 to provide a sealing of the components arranged on the interposer substrate 200.

FIG. 4 shows an embodiment of the integrated electrical and optoelectronic package 10, wherein the optoelectronic chip 110 of the optical subassembly 100 is flip-chip mounted on the spacer substrate 120. The optoelectronic chip 110 is electrically connected to the conductive layer 240 of the interposer 200 by metallized through-glass-vias 124 that are arranged within the material of the spacer substrate 120. The spacer substrate 120 is configured as a glass transposer 123.

The spacer substrate 120 configured as shown in FIGS. 1 to 4 allows to arrange the optoelectronic chip 110 at a distance above the interposer 200 so that the optical adaptor 300 may be optically coupled to the face side S110 of the optoelectronic chip 110 to couple light between the optical waveguides of the optical adaptor 300 and the waveguides of the optoelectronic chip 110.

The optoelectronic chip 110 is designed in a way that the alignment pins 350 of the optical adaptor 300 are centered with respect to the receptacle housing 400. This can be achieved in multiple technologies. According to a possible technology, the spacer substrate 120 as shown in FIG. 3 or being configured as the glass transposer 123 as shown in FIG. 4 is used. The spacer substrate 120 may be configured as a glass substrate with one metallization layer on each side of the spacer substrate and metallized through-glass vias 124, to mount the optoelectronic chip 110 using flip-chip assembly techniques, as illustrated in FIG. 4. Alignment by the alignment pins 350 can also be realized using glass transponders 120 with macro cut-outs able to accept the insertion of the alignment pins using precision alignment and assembly techniques.

In addition of using the glass transposer 123 as the spacer substrate for a flip-chip mounting of the optoelectronic chip 110, the glass transposer 123 allows for a higher amount of electrical input/output terminals and a more reliable electrical contact as compared to wire-bonding of the optoelectronic chip shown in FIG. 3 due to its improved RF performance compared to wire-bonding.

The spacer substrate 120/glass transposer 123 can be electrically connected to the interposer 200 using standard multi-chip-module assembly techniques. The thickness of the spacer substrate 120/the glass transposer 123 is designed such that the bottom of the receptacle housing 400 does not extend beyond the bottom of the interposer 200 so it does not interfere with the electrical connection elements 250 between the interposer 200 and the printed circuit board 20.

While the spacer substrate 120/glass transposer 123 is shown in FIGS. 3 and 4 as a single piece, according to another embodiment, the spacer substrate 120/glass transposer 123 may comprises several parts as shown, for example, in FIGS. 1 and 2. The top part, in this case the first spacer component 121, is configured to be mountable to the interposer 200, and the second spacer component 122, which is arranged between the optoelectronic converter 110 and the first spacer component 121, comprises the at least one cavity 125 to receive the at least one alignment element 350 of the optical adaptor 300. FIG. 1 illustrates the first and the second spacer component, wherein the top/second spacer component 122 has the at least one cavity formed as cut-outs 125, and the first, bottom spacer component 121 is configured as a solid sheet.

The integrated electrical and optoelectronic package 10 comprising the interposer 200, the optical subassembly 100 with the optical adaptor 300, the receptacle housing 400 and the electronic chip 600 are configured to be reflow soldered to the printed circuit board 20. Therefore, all materials and adhesives used for the components of the package 1 are chosen to be reflow solder compatible.

The interposer 200, for example, is made from glass or a glass ceramic. The optical subassembly 100 comprises the spacer substrate 120 made of glass. The plates 310, 320 and 330 of the optical adaptor 300 illustrated in FIG. 2 are also made of glass. The receptacle housing 400 can be made from a material having a high glass transition temperature $T_g$, for example a high-$T_g$ injection molded polymer or a low-CTE metal.

The receptacle housing 400 is mounted on the interposer 200 preferably before attachment of the electronic chip 600 and the optical subassembly 100. The arrangement of the spacer substrate 120 and optoelectronic chip 110 on the interposer 200 as well as the coupling of the optical adaptor 300 to the optoelectronic chip 110 has to be aligned such that the alignment pins 350 are centered in relation to the receptacle housing 400. This centering does not need to be performed to the same micron level of the optical alignment between the waveguides of optoelectronic chip and the optical fibers of the optical cable. Therefore the dimensional tolerance on the spacer substrate 120 is greatly relaxed and well within current manufacturing tolerances, for example about 5 μm.

Figure 5:
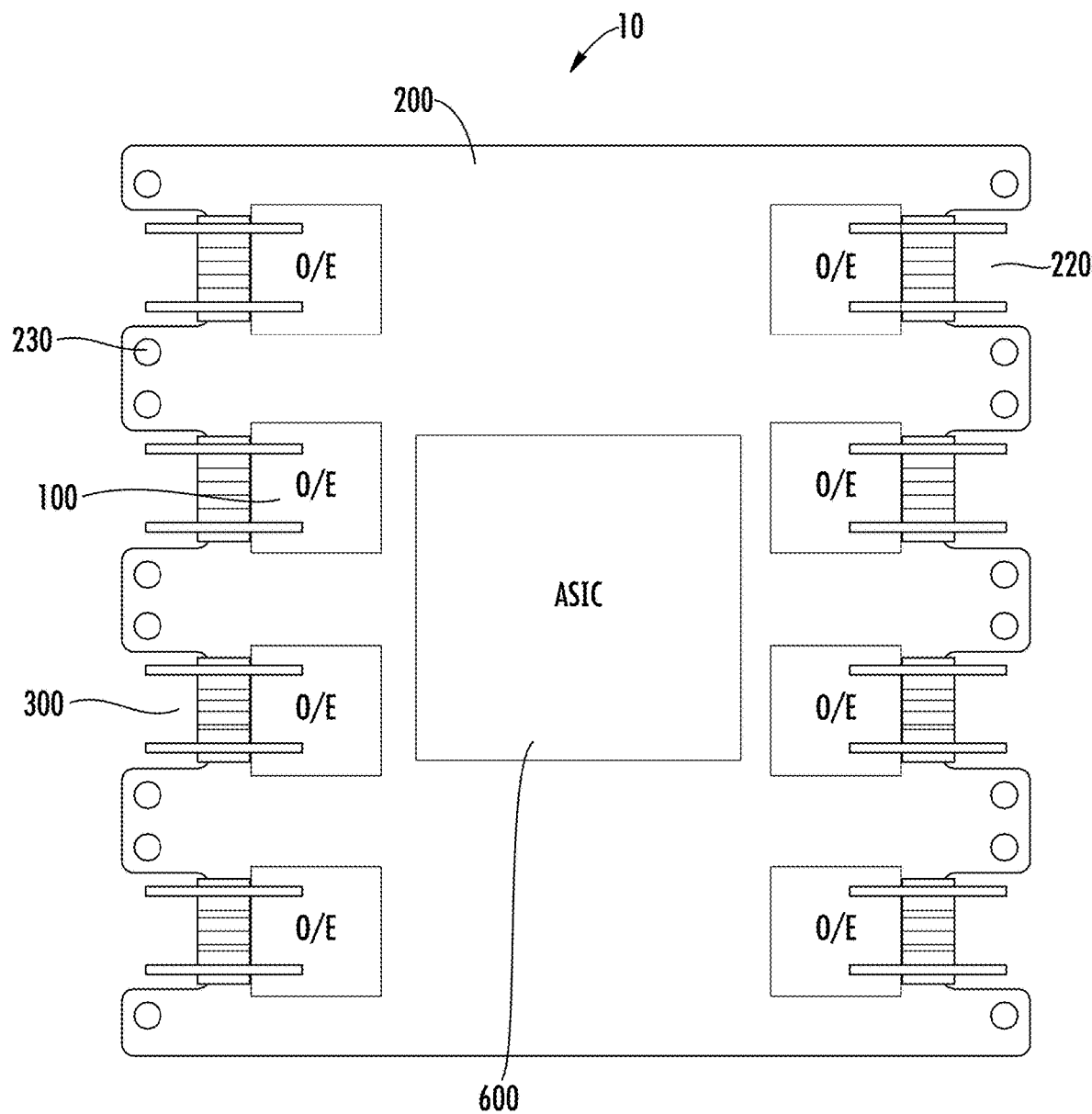
FIG. 5 shows a top view of an integrated electrical and optoelectronic package according to a second arrangement of components of the package.

FIG. 5 show a possible arrangement of the optical subassemblies 100 with the optical adaptors 300 mounted in front of the optoelectronic chips on the interposer 200. The electronic chip 600 is centered in a middle portion of the interposer 200. Two opposite sides of the interposer 200 respectively comprise several cut-out regions 220 in which the receptacle housings 400 are arranged. A respective optical subassembly 100 is arranged close to each of the cut-out regions 220. As shown in FIG. 5B, the optical subassemblies 100 are placed on two sides of the interposer 200, wherein a respective optical subassembly 100 is arranged close to a respective cut-out region 220. The two-sided layout shown in FIG. 5 has the advantage of avoiding fibers coming from the back of the packaged assembly having to be rooted to the front panel of an equipment rack; however, other arrangements are possible with the concepts disclosed.

Regarding the density of components included per interposer, the interposer may comprise at least one receptacle housing per 100 millimeters of perimeter of the interposer, but other suitable arrangements are possible such as at least one receptacle housing or optical subassembly per 50 millimeters of perimeter of the interposer, or at least one receptacle housing per 10 millimeters of perimeter of the interposer. Regarding the density of components included per major surface area of the interposer, the interposer may comprise at least one optical subassembly per 2500 square millimeters of the interposer, but other suitable arrangements are possible such as at least one optical subassembly per 1500 square millimeters of the interposer, or at least one optical subassembly per 100 square millimeters of the interposer.

Referring back to FIG. 4, using the glass transposer 123 for flip-chip mounting of the optoelectronic chip 110 has several advantages in heat management, since the backside of the chip of the optoelectronic chip 110 is fully accessible from the top and the heatsink can be efficiently mounted on top of the optoelectronic chip 110. The heatsink may be configured as the cap 730 shown in FIGS. 3 and 4.

Figure 6:
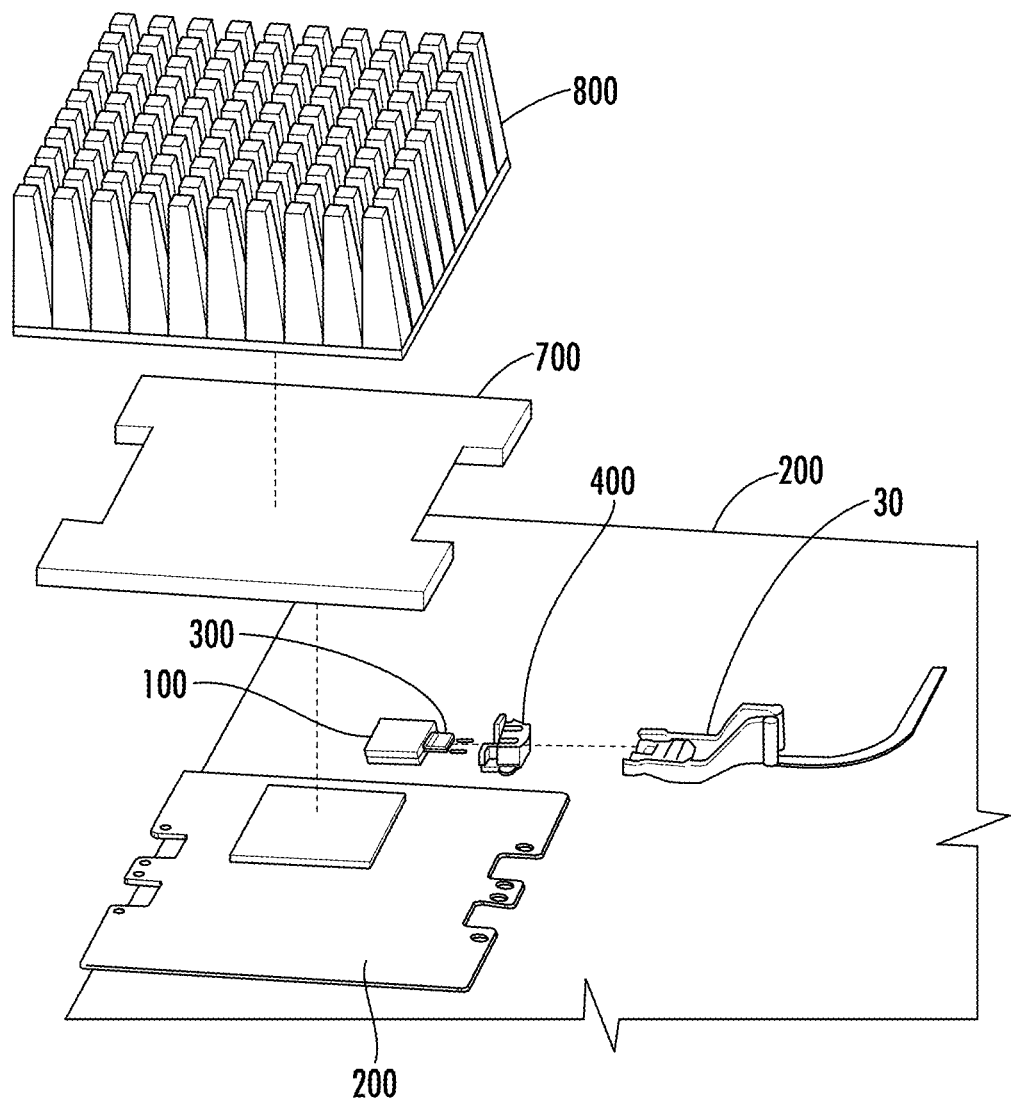
FIG. 6 shows components of an integrated electrical and optoelectronic package in a disassembled state.
Figure 7:
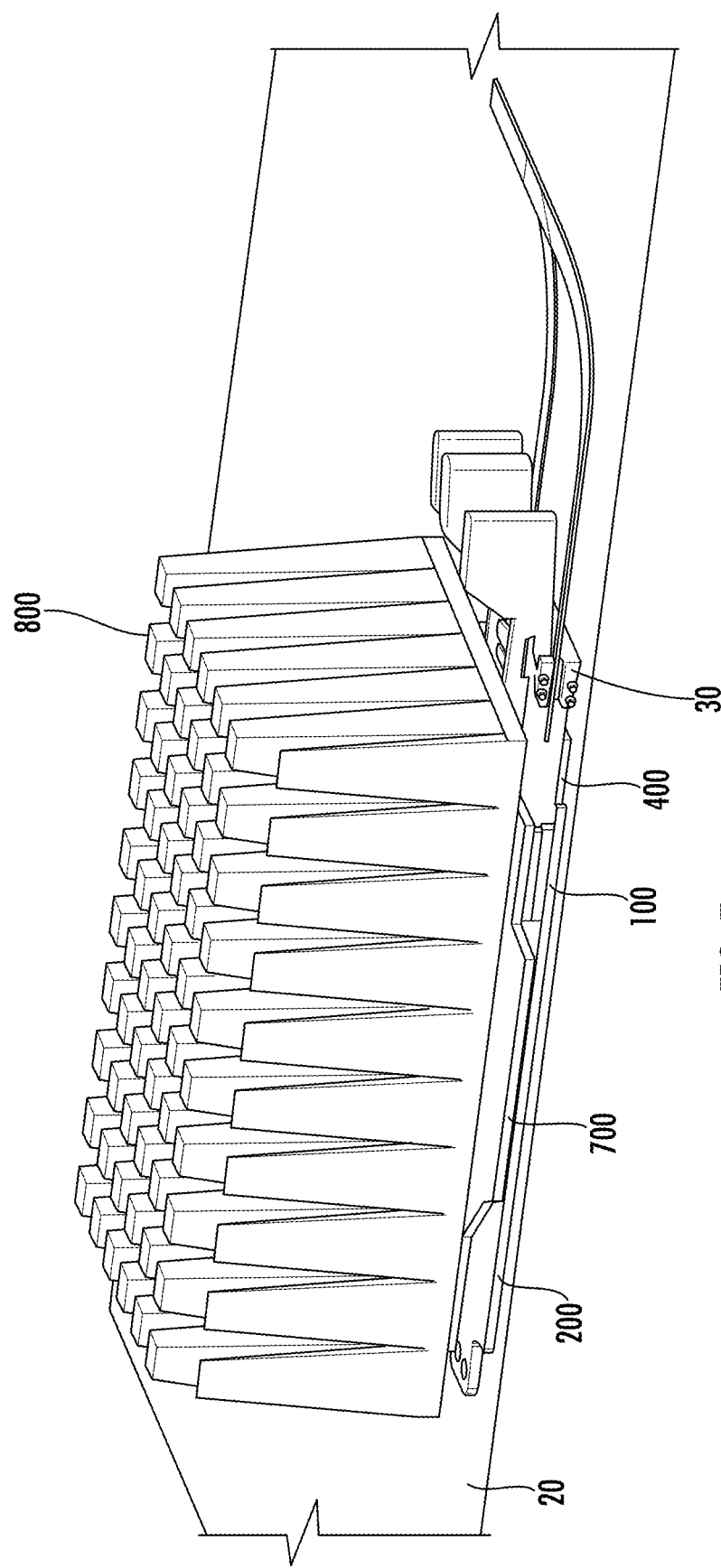
FIG. 7 shows the components of an integrated electrical and optoelectronic package in an assembled state.

FIG. 6 shows an exploded view of another embodiment of the integrated electrical and optoelectronic package 10 having heat dissipation properties. FIG. 7 shows the embodiment of the package 10 of FIG. 6 in an assembled condition.

According to the embodiment shown in FIGS. 6 and 7 the heatsink is configured as a cooling element 800. The cooling element is formed as a heat spreader that is arranged on top of the covering element 700, for example, the cap 730. The other components of the integrated electrical and optoelectronic package 10, i.e. the electronic chip 600, the optical subassembly 100 and the interposer 200 are arranged below the heat spreader 800.

The heatsink/heat spreader 800 is shown in FIGS. 6 and 7 as a single unit. It can be beneficial to separate the heat spreader into two or more heatsinks, for example one for the higher operating temperature electronic chip 600 and one for each of the optoelectronic chips 110 individually or all of them together. The electronic chip 600, such as an ASIC or a high performance CPU, has the need to dissipate up to several hundreds of Watts of thermal power and have operating temperatures up to 110° C. Optoelectronic chips 110 comprising opto-electrical converters 112 in the form of photonic integrated circuits generate thermal power especially if lasers come from an external source and have operating temperatures of no more than 85° C. They are also much more sensitive to temperature and have degraded performance at high temperature. Therefore, it is necessary to thermally isolate them from the electronic chip 600. A separate heatsink and the low thermal conductivity of the glass interposer 200 can be used to thermally isolate the optoelectronic ICs 110 from the electronic ICs 600.

Figure 8A:
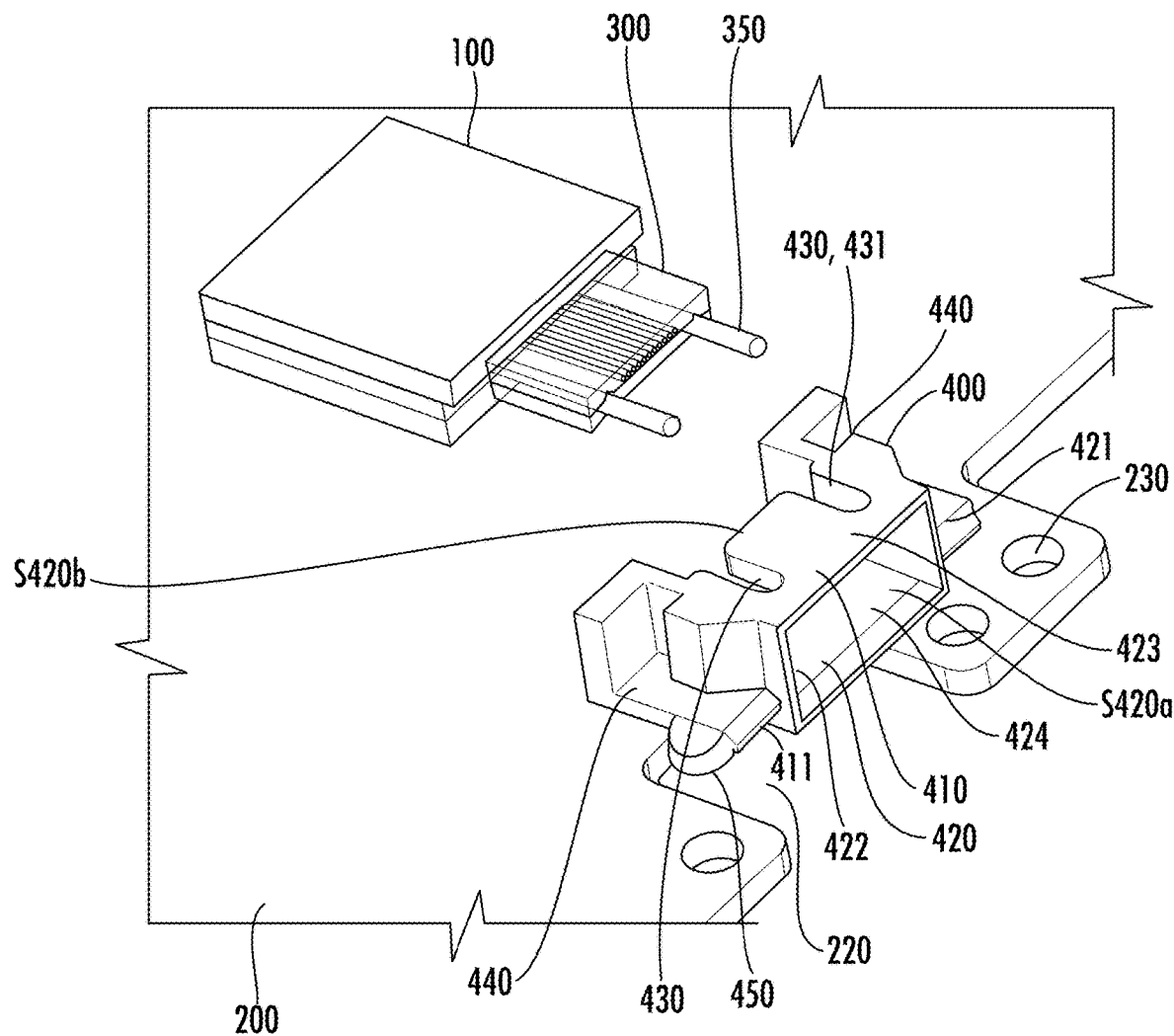
FIG. 8A shows an interposer, an optical subassembly and a receptacle housing in a disassembled state.
Figure 8B:
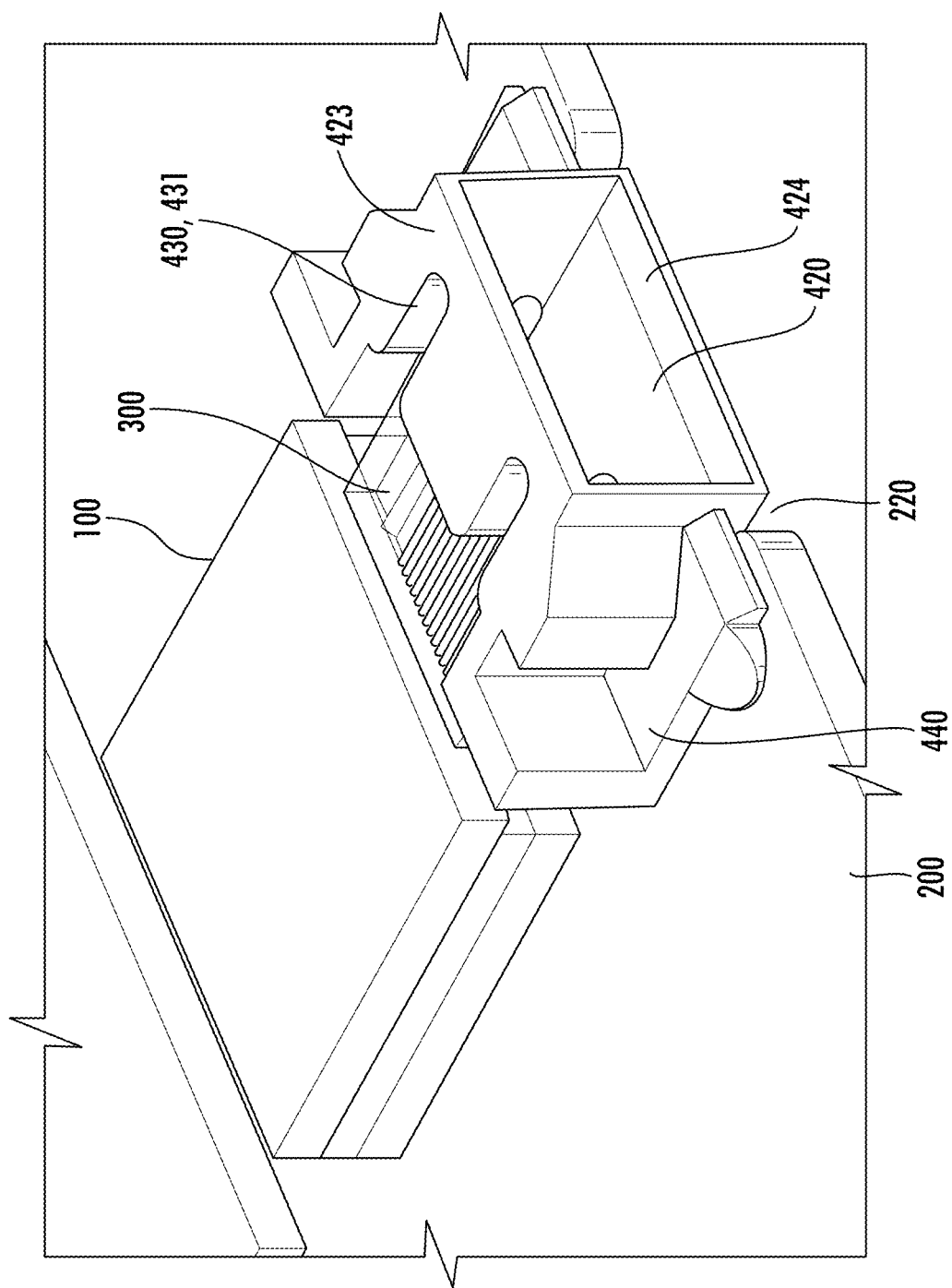
FIG. 8B shows an interposer, an optical subassembly and receptacle housing in an assembled state.
Figure 8C:
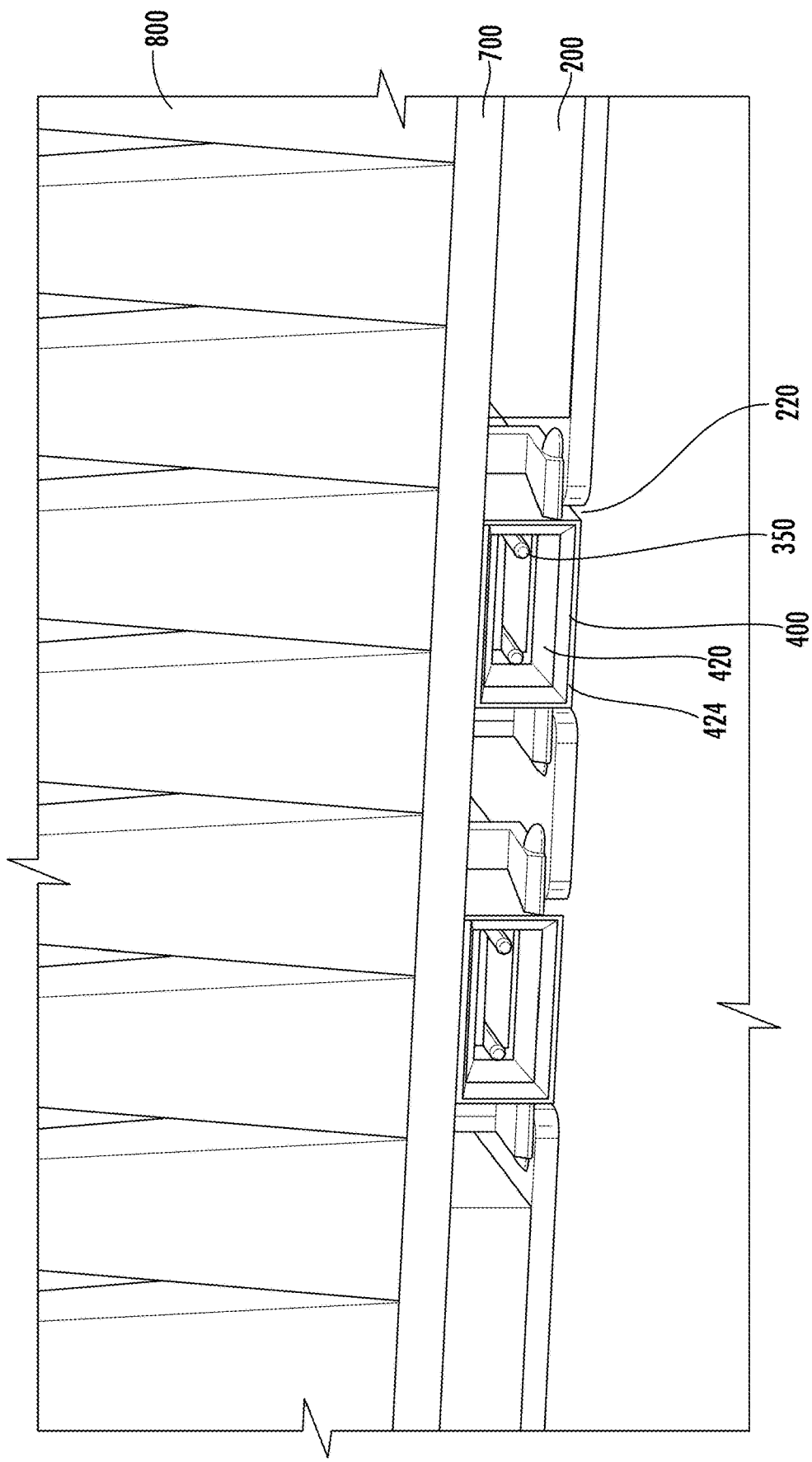
FIG. 8C shows a portion of an integrated electrical and optoelectronic package with a covering element comprising a lid and a heatsink.

FIGS. 8A and 8B shows a perspective view of a lateral portion of the interposer 200 with the cut-out regions 220 to insert the receptacle housing 400. The optical subassembly 100 is shown with the optical adaptor 300 mounted in front of the optoelectronic chip 110 being mounted on a spacer substrate 120. FIG. 8A shows the components before mating, and FIG. 8B shows the components in a mated state. FIG. 8C shows a front view of the package from a lateral side with the receptacle housing 400 mounted in the cut-out regions 220 of the interposer 200. The receptacle housings 400 are covered by the covering element 700. The heat spreader 800 is arranged on top of the covering element 700.

The receptacle housing 400 is configured to house the optical subassembly 100, in particular the optical adaptor 300 of the optical subassembly, and the optical connector 30 that is not shown in FIGS. 8A to 8C. The receptacle housing 400 comprises a body 410 having a tunnel 420 to receive the optical connector 30 at a first side S420a of the tunnel and to receive the optical adaptor 300 as an interface between the optoelectronic chip 110 and the optical connector 30 at a second side S420b of the tunnel 420. The body 410 of the receptacle housing has at least one slot 430 to receive at least one alignment pin 350 of the optical adaptor 300 to align the optical adaptor 300 and the optical connector 30 in the tunnel 420.

The tunnel 420 has sidewalls 421, 422 as well as a covering portion 423 and a bottom portion 424. The at least one slot 430 to receive the portion 351 of the at least one alignment pin 350 of the optical adaptor 300 has an open side 431 in the covering portion 423 of the tunnel 420 to insert the at least one alignment pin 350 into the slot 430 from the open side 431 of the slot into the slot 430, when the receptacle housing 400 is mounted to the rim of the interposer 200 and the optical subassembly 100 with the optical adaptor 300 is placed in a subsequent step from above on the interposer 200.

The receptacle housing 400 comprises at least one pin 450 protruding out of a lower surface 411 of the body 410 of the receptacle housing. The at least one pin 450 is configured to be inserted in the hole 230 of the interposer 200 to secure and align the receptacle housing 400 on the interposer 200 by a pin-hole connection. In the mated state shown in FIG. 8B the receptacle housing 400 is placed in the cut-out region 220 of the interposer 200 that is configured to receive the receptacle housing 400. The pins 450 of the receptacle housing 400 could be used to align the receptacle housing 400 with the optical subassembly 100/the optical adaptor 300. As shown in FIG. 8B, the bottom portion 424 of the tunnel 420 of the receptacle housing 400 is arranged in the cut-out region 220 of the interposer 200. In either case, the cut-out regions 220 of the interposer 200 allow to reduce the overall height of the receptacle housing 400. The at least one pin 440 of the receptacle housing 400 is received in the at least one hole 230 of the interposer 200 to secure the receptacle housing 400 on the interposer 200. The pin-hole connection may be fixed by an adhesive component.

FIG. 8C shows the integrated electrical and optoelectronic package 10 with the receptacle housing 400 and the optical adaptor 300 arranged in the tunnel 420 of the housing. The covering element 700 and the heat spreader 800 are arranged on top of the receptacle housing 400. The receptacle housing provides the locking and keying features for coupling the optical connector 30 to the package 10. The tunnel 420 provides a prealignment for the ferrule of the optical adaptor 300. In particular, the rectangular-shaped tunnel 420 allows to prealign the ferrule of the optical adaptor 300 in an x- and y-direction.

The receptacle housing 400 can be made of a high temperature liquid crystal polymer (LCP) that withstands the influences of the high temperatures during a reflow-solder process to mount the package 10 on a printed circuit board. The pins 450 may be removed before solder reflow to eliminate any stress build-up due to any CTE mismatch. Nevertheless, the receptacle housing 400 is in mechanical contact with the interposer 200 for robustness and stability.

Two ways are possible for assembling the components from the top. According to a first assembling method, the receptacle housing 400 may be placed on the interposer 200 before mounting the optical subassembly 100 on the interposer 200. In this case after having fixed the receptacle housing 400 in the holes 230 and the cut-out regions 220 of the interposer, the alignment pins 350 are inserted from the top in the slots 430 of the receptacle housing 400, as shown in FIG. 8B. According to a second possible assembling method, the optical assembly 100 is mounted on the interposer before mounting the receptacle housing 400 on the interposer.

Figure 9:
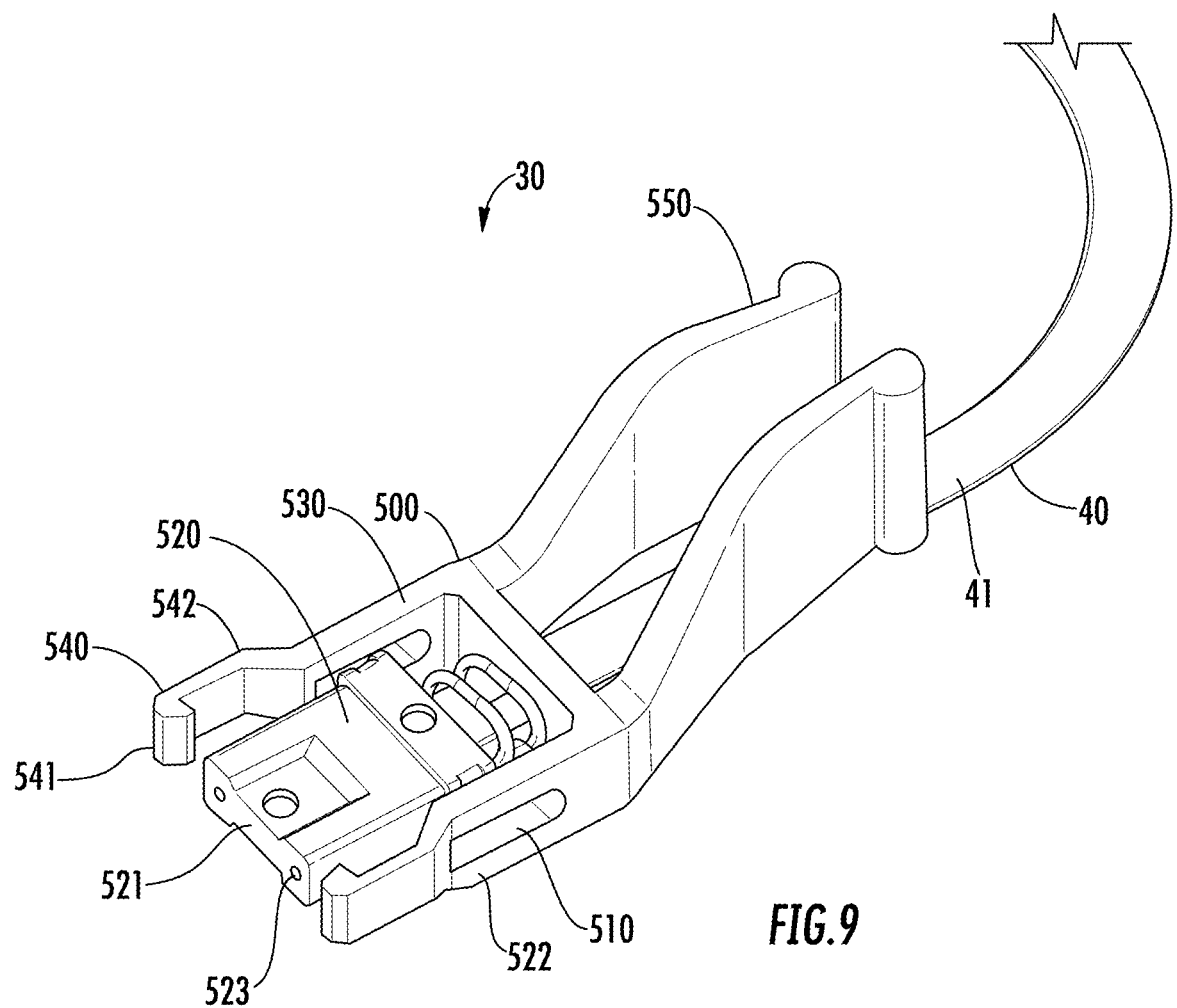
FIG. 9 shows an embodiment of an optical connector terminating an optical cable.

FIG. 9 shows an embodiment of an optical connector 30 to be coupled to the integrated electrical and optoelectronic package 10. The optical connector 30 is configured for terminating the optical cable 40 comprising optical fibers 41, for example a fiber ribbon cable. The optical fibers 41 could be in a standard ribbon matrix or a flexible sheet like FlexPlane™ Optical Flex Circuits, from Molex®. The optical connector 30 comprises a connector body 500 and a ferrule 520 having channels 521 being configured to receive a respective one of the optical fibers 41 of the optical cable 40. Furthermore, the ferrule 520 comprises at least one protrusion 522, as illustrated for example in FIGS. 2 and 9. A portion of the body 500 has at least one guiding slot 510. The ferrule 520 is arranged in the connector body 500 such that the at least one protrusion 522 is movably arranged in the at least one guiding slot 510 of the connector body 500. The ferrule 520 may be based on an MTP/MPO female interface, due to existing technology and processes. The main function of the ferrule 520 is to align the fiber end faces of the optical fibers 41 of the optical cable 40 and to compress the optical fibers to the optical subassembly 100, and particularly to the optical adaptor 300.

The optical connector 30 further comprises a spring element 530 being coupled to the ferrule 520. The spring element 530 is configured to exert a force to the ferrule 520 such that the ferrule 520 is pushed against the optical adaptor 300 and thus against the optoelectronic chip 110, when the optical connector 30 is inserted in the tunnel 420 of the receptacle housing 400. The moving direction of the ferrule 520 is defined by means of the protrusions 522 being guided within the guiding slots 51 of the connector body 500, when the optical connector 30 is inserted in the tunnel 420 of the receptacle housing 400 and the spring element 530 pushes the ferrule 520 against the optical adaptor 30 or directly against the optical subassembly 100.

Figure 10:
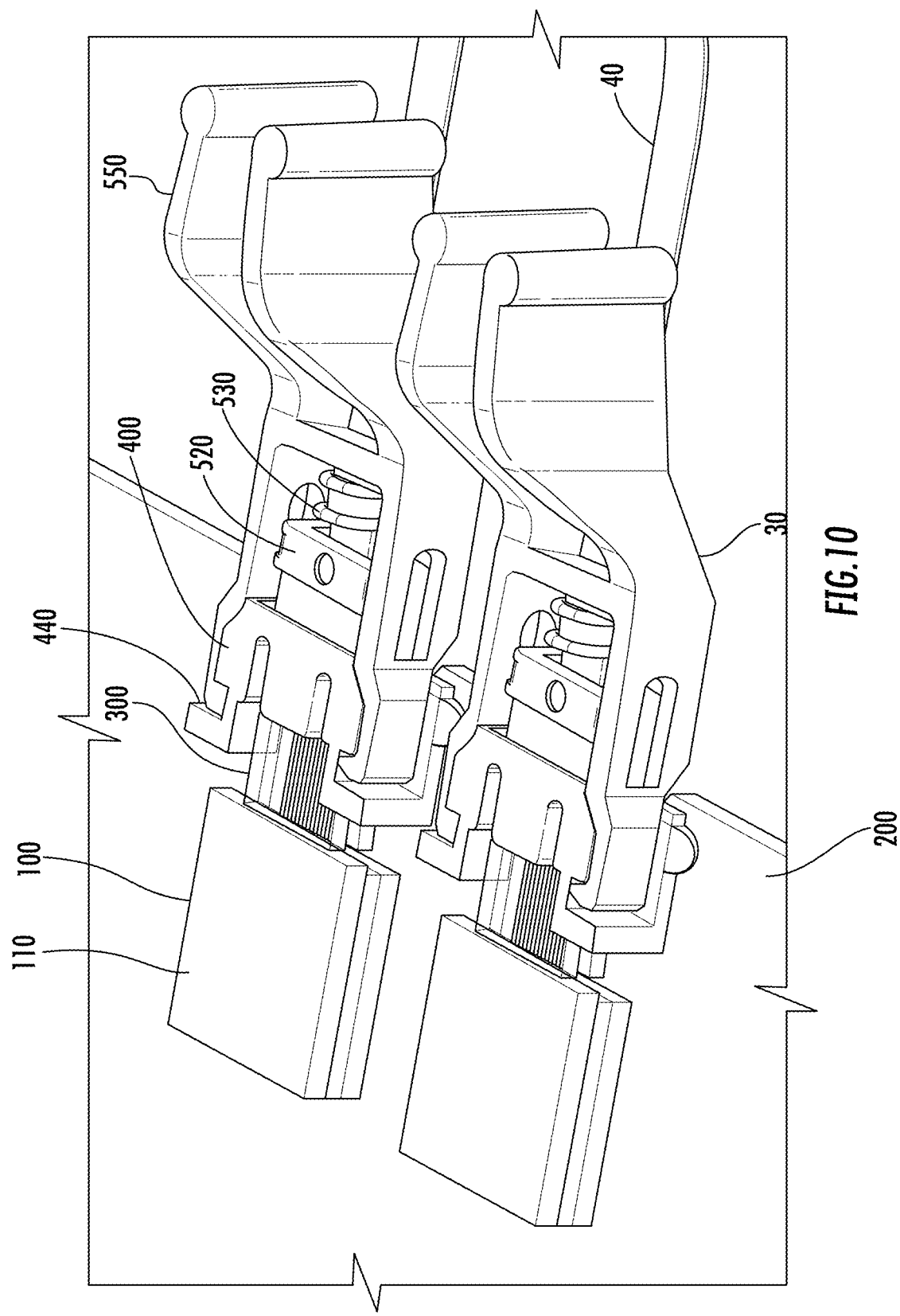
FIG. 10 shows a lateral portion of an integrated electrical and optoelectronic package with an optical connector mechanically coupled to the package.

The optical connector 30 is configured to be secured to the receptacle housing 400. For this purpose, the connector body 500 comprises at least one engagement element 540 to hold the optical connector 30 to the receptacle housing 400. FIG. 10 shows optical connectors 30 being coupled to the integrated electrical and optoelectronic package 10. The at least one engagement element 540 comprises a flexible hook 541, as illustrated in FIG. 9, to engage in the engagement structure 440 of the receptacle housing 400. The ferrule 520 is movably arranged between the arms 542 of the engagement element 540.

As shown in FIGS. 9 and 10, the connector body 500 of the optical connector 30 comprises an actuation element 550 to release the at least one engagement element 540 to decouple/de-mate the optical connector 30 from the receptacle housing 400. The mating and demating operation can be done manually by means of wing-shaped ends of the actuation element 550, which allow finger access between two connections. For mating, the optical connector 30 can be pushed forward in the tunnel 420 of the receptacle housing 400 on the straight end of the wing-shaped end of the actuation element 550 with one finger. To release the optical connector the wings of the actuation element 550 may be pressed together by two fingers so that the engagement element 540, in particular the flexible hooks 541, are released from the engagement structure 440 of the body 410 of the receptacle housing 400.

Referring to FIGS. 9 and 10, the optical connector 30 is formed as a clip having an H-shape. The snap hooks 541 are directed towards the receptacle housing 400. The snap hooks 541 lock the optical connector 30 to the receptacle housing 400 in z-direction. To release the snap hooks 541, the H-shape is pressed together at the opposite side. The angled wings of the actuation element 550 are designed in a way that their movement is limited in pressed condition. The clip is designed to open the snap hooks 541 without releasing the protrusions/ears 522 of the ferrule 520 from the guiding slots 530 of the optical connector 30.

According to the embodiment shown in FIGS. 9 and 10, the ferrule 520 may be configured as an MTP ferrule having symmetric protrusions 522 which are mated to the guiding slots 510 of the connector body 500. It is possible to shape the geometry of the protrusions 522 in different styles to hold the ferrule 520 within the body 500 of the optical connector 30 in position. During unmating the ferrule 520 is pulled off by engaging its protrusions 522 with the clip.

In the assembled condition, the protrusions 522 of the ferrule 520 in combination with the spring element 530 prevent the ferrule 520 from falling off the clip. Being mated, the optical connector 30 is designed to offer maximum floating space for the ferrule in each direction to avoid disturbances, for example mechanical misalignment to the end faces of the optical waveguides 340.

As best shown in FIG. 1, the engagement element 540/ snap hooks 541 are created off-center in the area of the receptacle housing 400. The clip design of the optical connector 30 enables an asymmetric locking which avoids the wrong mating of the symmetric ferrule 520, for example an MTP ferrule. Once the ferrule 520 is installed in the right orientation in the body 500 of the optical connector 30, the optical connector 30 can only be mated to the electrical and optoelectronic package 10 in one direction. Due to the printed circuit board 20 arranged underneath the interposer 200, there is no space to turn the optical connector 30 around. In this case, the wings of actuation element 550 would prevent the ferrule 520 from being inserted in the receptacle housing 400.

As an alternative embodiment, the ferrule 520 may comprise an asymmetric feature, for example, out of center ears/protrusions 522 which are also incorporated into the optical connector. According to another embodiment, the snap hooks 541 may be designed in an angled fashion so that they only can grab the receptacle housing 400 in the right orientation.

The ferrule 520 is movably arranged in the body 500 between the arms of the engagement element 540. The guiding slot 530 is formed in the arms of the engagement element 540. In particular, the ferrule 520 is arranged in the body 500 of the optical connector 30 so that the ferrule can float in the clip structure of the optical connector without losing its attachment. This freedom allows the ferrule 520 to be prealigned to the receptacle housing 400 independent from the mechanical coupling of the optical connector 30 to the receptacle housing 400 by means of the engagement element 540. In the mated condition shown in FIG. 10, only the compression force from the spring element 530 is applied by the connector, but no alignment is performed by the connector. The alignment is rather done in two steps: first, the receptacle housing 400 enables a prealignment, and second, the alignment pins 350 of the optical adaptor 300 engage with the ferrule 520 for the final precise alignment.

Figure 11:
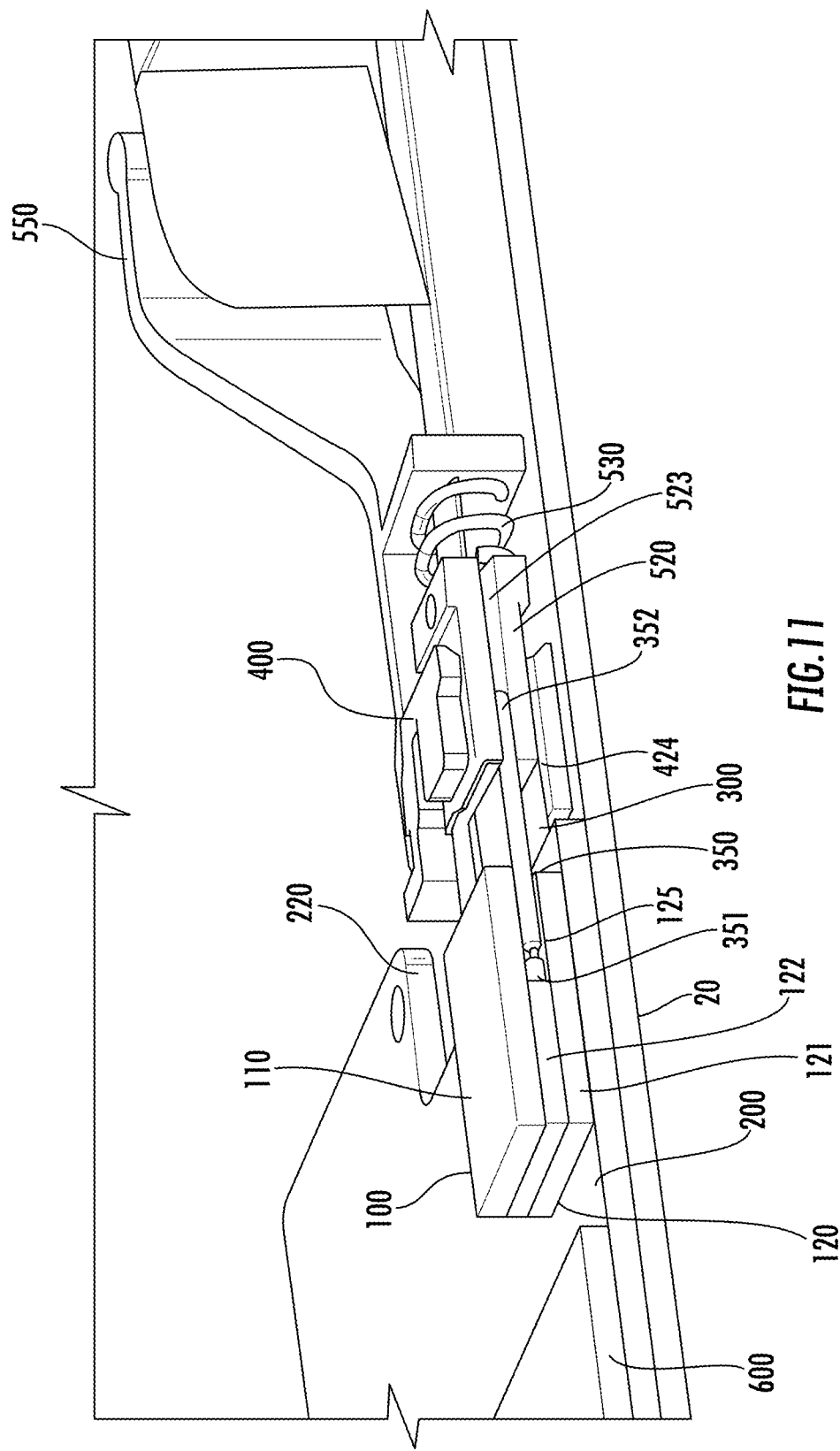
FIG. 11 shows a cross-sectional view of an integrated electrical and optoelectronic package and an optical connector in a mated condition.

FIG. 11 shows a cross-sectional view of the optical connection between the ferrule 520 and the components of the package 10, i.e. the optical adaptor 300 and the optoelectronic chip 110 of the optical subassembly 100. The optical subassembly 100 is shown comprising the spacer substrate 120 including the first spacer component 121 and the second spacer component 122. The second spacer component 122 is mounted between the optoelectronic chip 110 and the first spacer component 121 that is arranged on the interposer 20. The at least one cavity 125 to receive the portion 351 of the alignment pin 350 is provided in the second spacer component 122. The optical adaptor 300 is mechanically coupled to the optical subassembly 100 by means of the first portion 351 of the at least one alignment pin 350 of the optical adaptor 300. The first portion 351 of the at least one alignment pin 350 is inserted in the at least one cavity 125 of the optical subassembly 100.

The optical adaptor 300 is mechanically coupled to the receptacle housing 400 by inserting the second portion 352 of the at least one alignment pin 350 of the optical adaptor 300 in the at least one slot 430 of the receptacle housing 400. When the optical connector 30 is inserted in the tunnel of the receptacle housing 400 the spring element 530 pushes the ferrule 520 against the optical adaptor 300. The ferrule 520 comprises at least one cavity 523 to insert a second portion 352 of the at least one alignment pin 350 to mechanically couple the ferrule 520 to the optical adaptor 300. The coupling by means of the at least one alignment pin 350 further allows to align the optical fibers 41 of the optical cable 40 terminating at an end face of the ferrule 520 to the optical waveguides 340 of the optical adaptor 300 and further to the optical waveguides of the optoelectronic chip 110.

As shown in FIG. 11, there are two physical contact locations. Firstly, the ferrule 520, for example an MTP ferrule, presses the fiber end faces of the optical fibers 41 of the optical cable 40 against the fiber end faces of the optical waveguides 340 in the glass ferrule of the optical adaptor 300. Secondly, the optical fibers included in the glass ferrule of the optical adaptor 300 are attached to the edge/side face S110 of the optoelectronic chip 110 without much compressive force. To enable a physical contact of the ends of the optical waveguides 340 towards the optical waveguides of the optoelectronic chip 110, an index-matching gel can be used between the optical adaptor 300 and the optoelectronic chip 110.

According to another possible embodiment, the optical connector 30 can be plugged directly on the side face S110 of the optoelectronic chip 110 so that no interface/optical adaptor is used between the optical connector 30 and the optoelectronic chip 110.

Figure 12A:
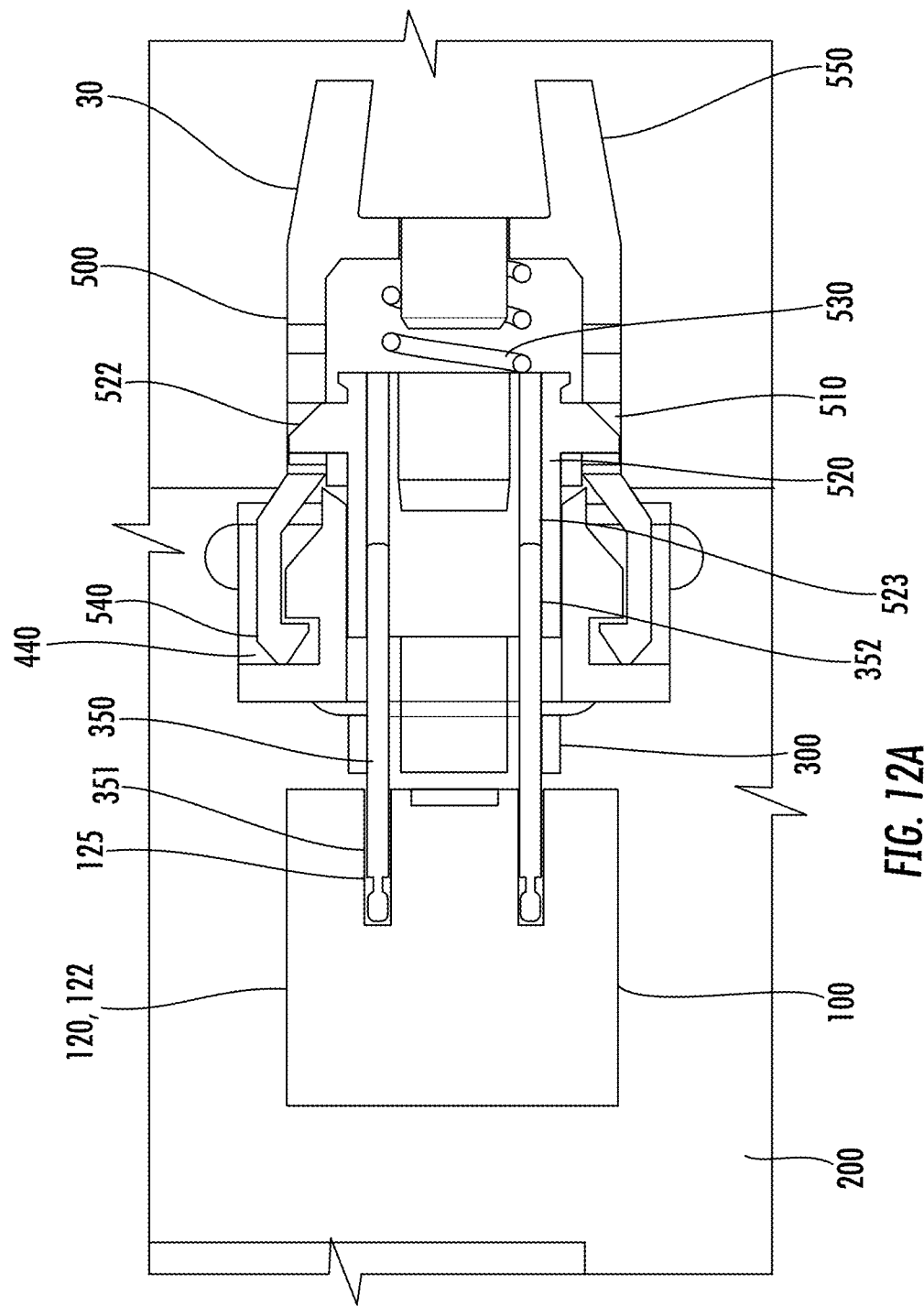
FIG. 12A shows a cross-sectional view of an integrated electrical and optoelectronic package and an optical connector in a first plane.
Figure 12B:
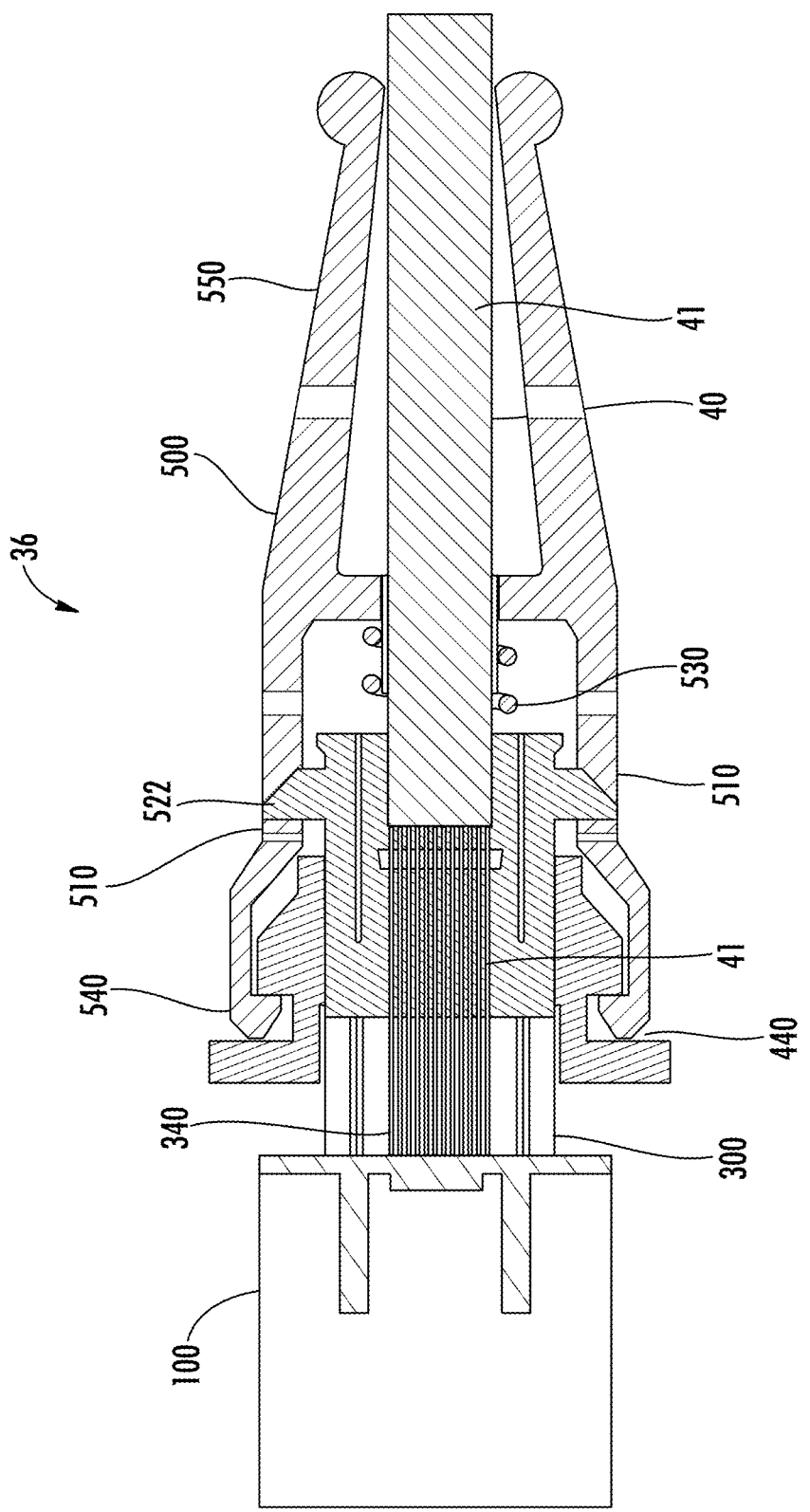
FIG. 12B shows a cross-sectional view of an integrated electrical and optoelectronic package and an optical connector in a second plane.

FIG. 12A shows a cross-section through the connection between the optical connector 30 and the optical subassembly 100 of the integrated electrical and optoelectronic package 10. FIG. 12B shows a cross-section through the connection of the optical connector 30 to the optical subassembly 100 from a bottom view. The optical adaptor 300 is mechanically coupled to the optoelectronic chip 110 of the optical subassembly 100 by the first portion 351 of the at least one alignment pin 350 of the optical adaptor 300 being arranged in the at least one cavity 125 of the optical subassembly 100. Furthermore, as shown in FIG. 12B, the alignment pins 350 are responsible for the precise alignment of the fiber cores of the optical fibers 41 of the optical cable 40 and the optical waveguides 340 of the optical adaptor 300 to each other in an x- and y-direction.

Figure 13:
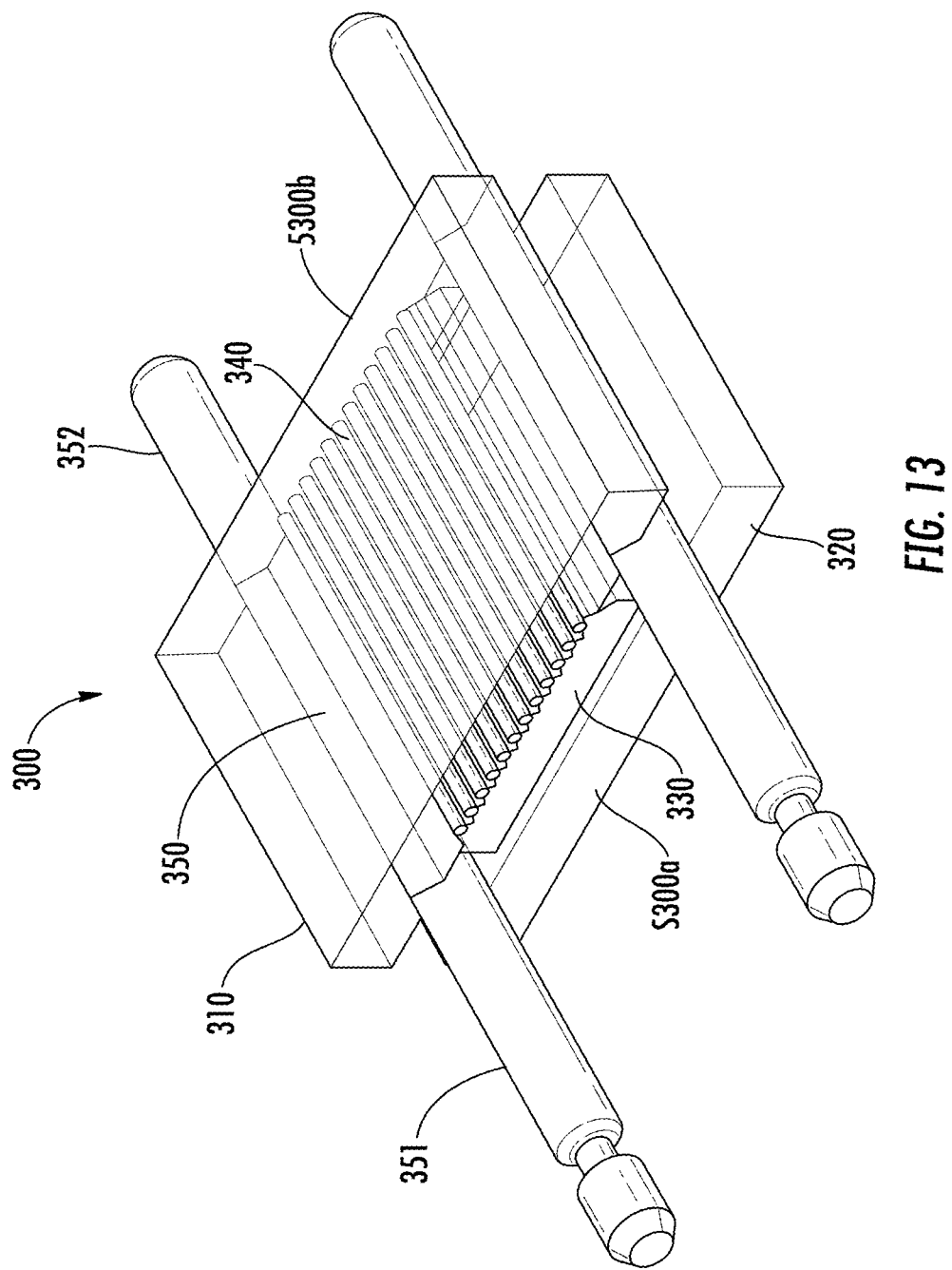
FIG. 13 shows a perspective view of an optical adaptor of an integrated electrical and optoelectronic package.

FIG. 13 shows an embodiment of the optical adaptor 300 used as an interface to transfer light between the optical fibers 41 of the optical cable 40 and the optical waveguides of the optoelectronic chip 110. FIG. 13 shows the optical adaptor 300 comprising the plurality of short optical waveguides 340 and the at least one alignment pin 350. According to the embodiment shown in FIG. 13, the optical adaptor comprises two alignment pins 350 respectively having a first portion 351 that projects out of the optical adaptor 300 at a first side S300a. The first portion 351 of the alignment pins 350 is used to align the optical waveguides of the optoelectronic chip 110 and the optical waveguides 340 of the optical adaptor 300 to transfer light between the optical waveguides 111 and the optical waveguides 340 with low loss.

Figure 20:
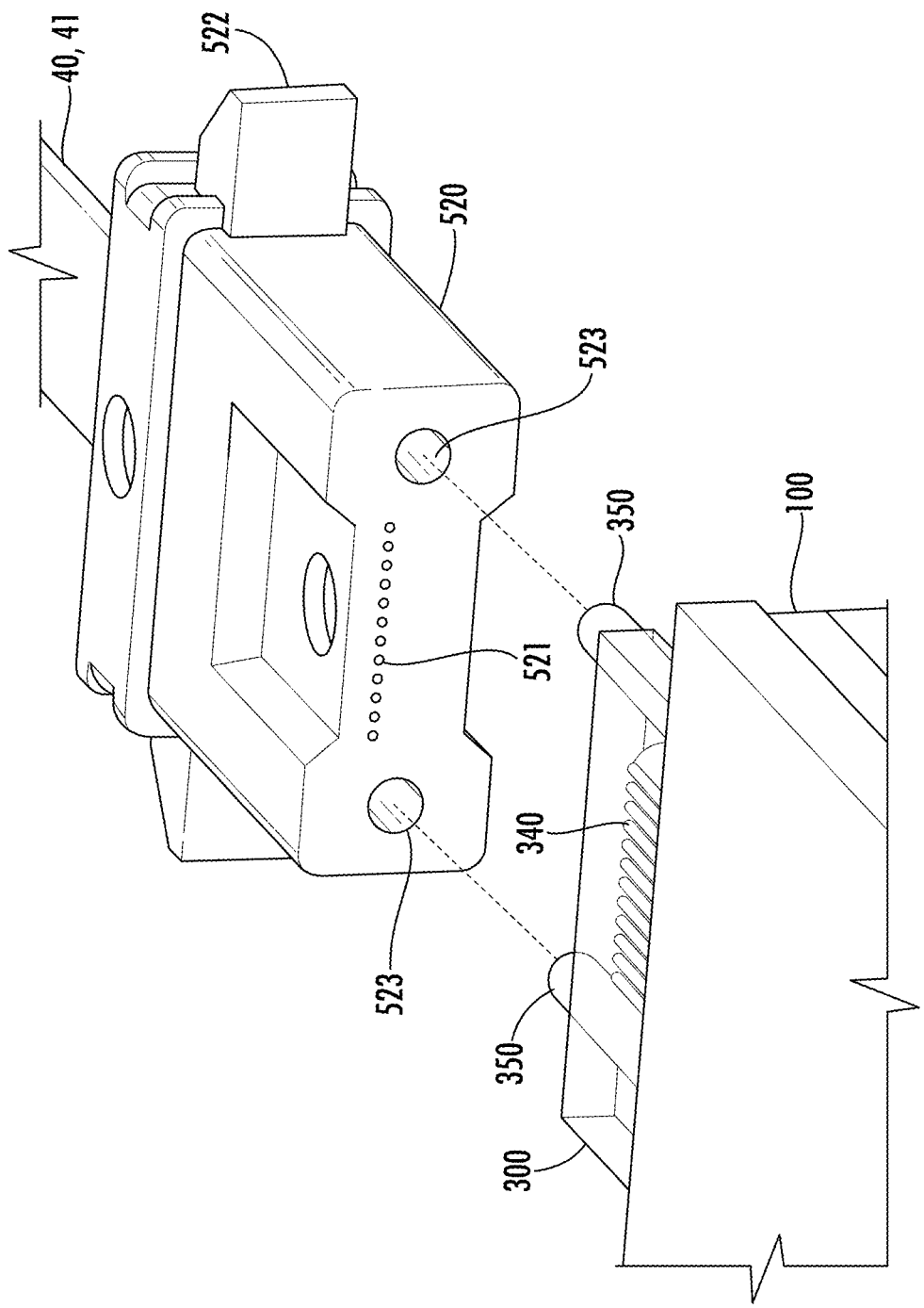
FIG. 20 shows an optical subassembly and an optical adaptor in a mated condition and a ferrule of an optical connector in an unmated condition.

The alignment pins 350 respectively have a second portion 352 projecting out of the optical adaptor 300 at a second side S300b. The second portion 352 of the alignment pins 350 is configured to be inserted in cavities 523 of the ferrule 520 to align the optical fibers 41 of the optical cable 40 and the optical waveguides 340 of the optical adaptor 300 to transfer light between the optical waveguides 340 and the optical fibers 41 of the optical cable 40. The cavities 523 provided in an end face of the ferrule 520 are shown in FIG. 20.

Figure 14A:
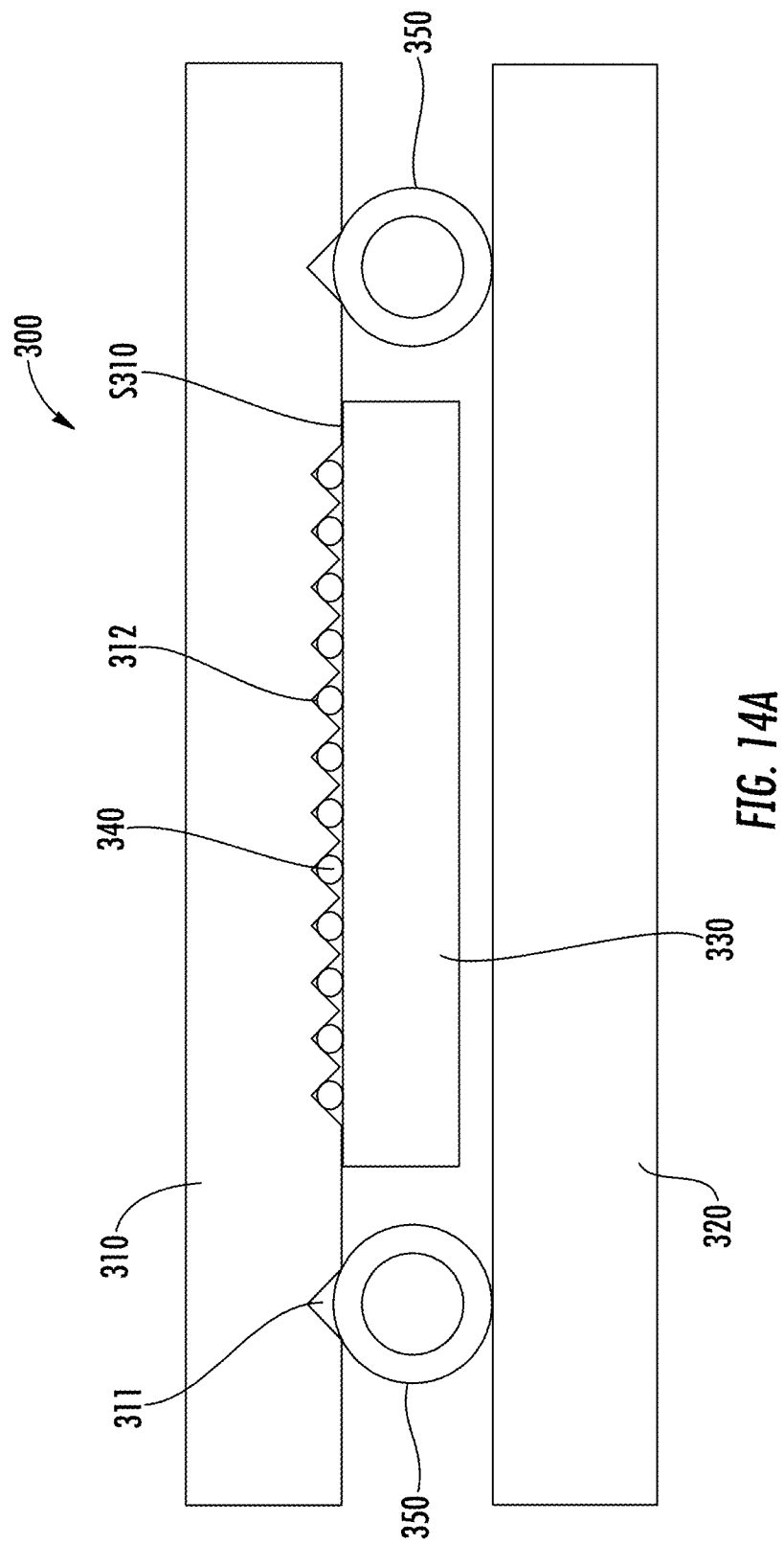
FIG. 14A shows a front view of an embodiment of an optical adaptor of an integrated electrical and optoelectronic package.

FIG. 14A shows a cross-sectional view of the optical adaptor 300 according to a first embodiment. The optical adaptor 300 comprises a glass plate 310 comprising at least one groove 311 to receive the at least one alignment pin 350. The optical adaptor 300 further comprises a glass plate 320 being arranged below the glass plate 310 such that the at least one alignment pin 350 is fixed between the glass plates 310 and 320. The first portion 351 of the alignment pins 350 projects out of a first face side of the glass plates 310 and 320. The second portion 352 of the alignment pins 350 projects out of a second face side of the glass plates 310 and 320. The glass plate 310 comprises a plurality of grooves 312 that may be configured as v-grooves. Each of the grooves 312 is configured to receive one of the optical waveguides 340. The optical adaptor further comprises a glass plate 330 that is arranged on a surface S310 of the glass plate 310, the surface S310 of the glass plate 310 being directed to the glass plate 320. The optical waveguides 340 are covered by the glass plate 330.

The at least one alignment pin 350 is fixed in the at least one groove 311 and the optical waveguides 340 are fixed in the grooves 312 by means of an adhesive. The optical waveguides extends between the first and the second side S300a, S300b of the optical adaptor. End faces of the optical waveguides may be polished and terminate at the end faces of the glass pate 310.

Figure 14B:
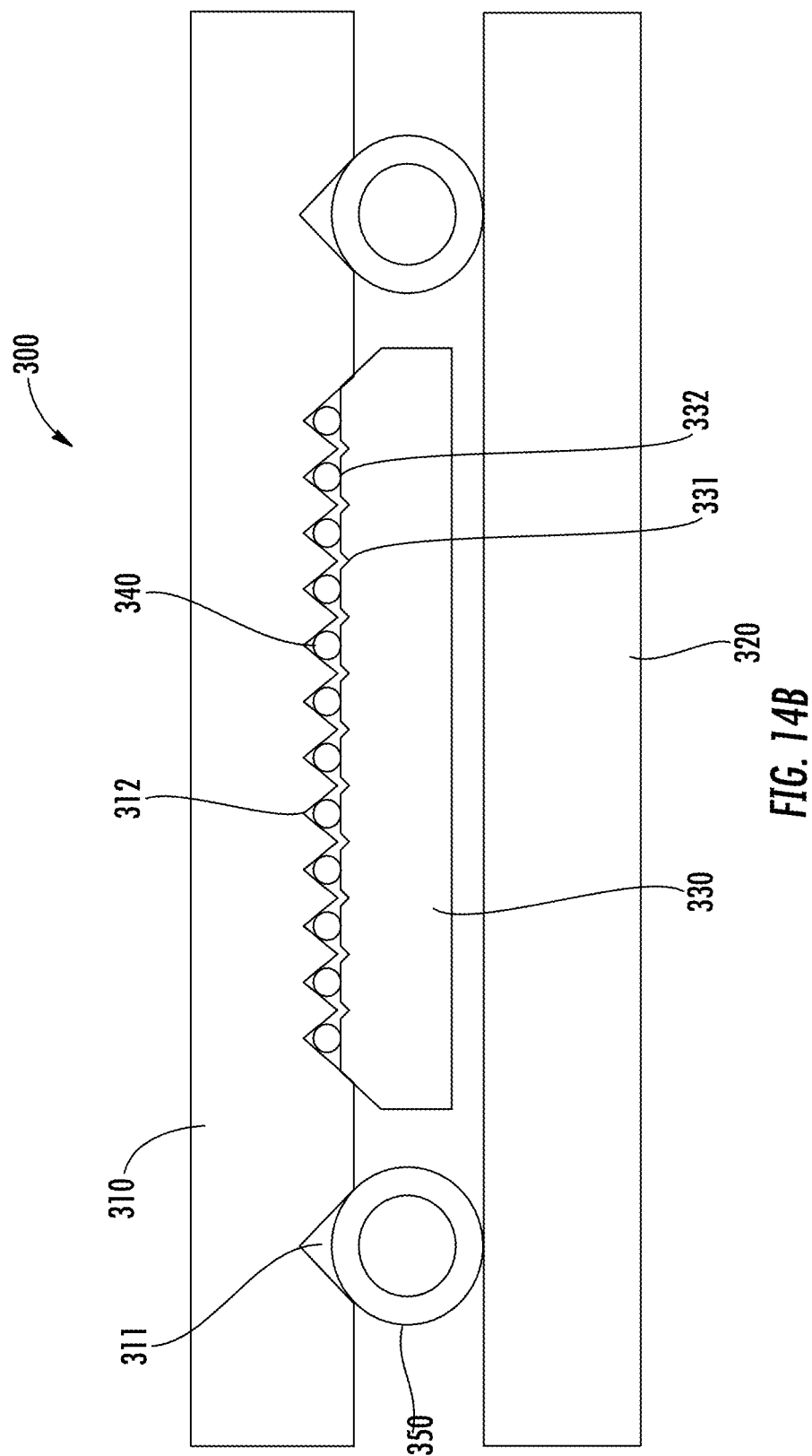
FIG. 14B shows a front view of a second embodiment of an optical adaptor of an integrated electrical and optoelectronic package.

FIG. 14B shows another embodiment of the optical adaptor 300, wherein the glass plate 330 has a plurality of grooves 331 being respectively separated by a flat surface portion 332. As illustrated in FIG. 14B, the glass plate 330 is arranged on the surface S310 of the glass plate 310 such that the optical waveguides 340 of the optical adaptor 300 are covered by the flat surface portions 332 of the glass plate 330.

The glass plates 310, 320 and 330 form a glass ferrule including the optical waveguides 340 with attached alignment pins 350. Such a subassembly allows a modular approach for fiber chip coupling. Basically MTP-ferrules, such as the ferrule 520, can be attached on the side S300b of the optical adaptor, and a chip structure, such as the end face S110 of the optoelectronic chip 110 can be attached on the other side S300a of the optical adaptor 300. The grooves 312 enable to align the optical waveguides 340 precisely relative to the alignment pins 350.

According to the glass cover concept shown in FIG. 14A, the surface of the glass plate 330 is flat to simply fix the optical waveguides 340 into the v-grooves 312. The glass plate 320 has no v-grooves and is glued underneath the assembly of the glass plates 310 and 330. The main function of the glass plate 330 is to fix the alignment pins 350 in their v-grooves 311. All the glass plates are glued together to build the common glass ferrule with the optical waveguides 340 and the fixed alignment pins 350.

According to the embodiments of the optical adaptor 300 shown in FIGS. 13, 14A and 14B, a center axis of the at least one alignment pin 350 and a respective center axis of the optical waveguides 340 are arranged with an offset to each other in a direction perpendicular to the respective center axis of the at least one alignment pin 350 and the optical waveguides 340. In this arrangement, the fiber cores have an offset relative to the alignment pins, because the alignment pins do not engage with the edge S110 of the optoelectronic chip 110, but engage with the spacer substrate 120. The offset needs to be adjusted and controlled to several dimensions, for example v-groove, v-groove depth, etc. In this v-groove constellation the offset is very limited.

In particular, the embodiment shown in FIG. 14b provides an improved variation of the offset. According to this embodiment the cover plate 310 as well as the fixation plate 330 have v-groves 312, 331 to allow a better variation of the fiber core to pin's surface offset.

Figure 15A:
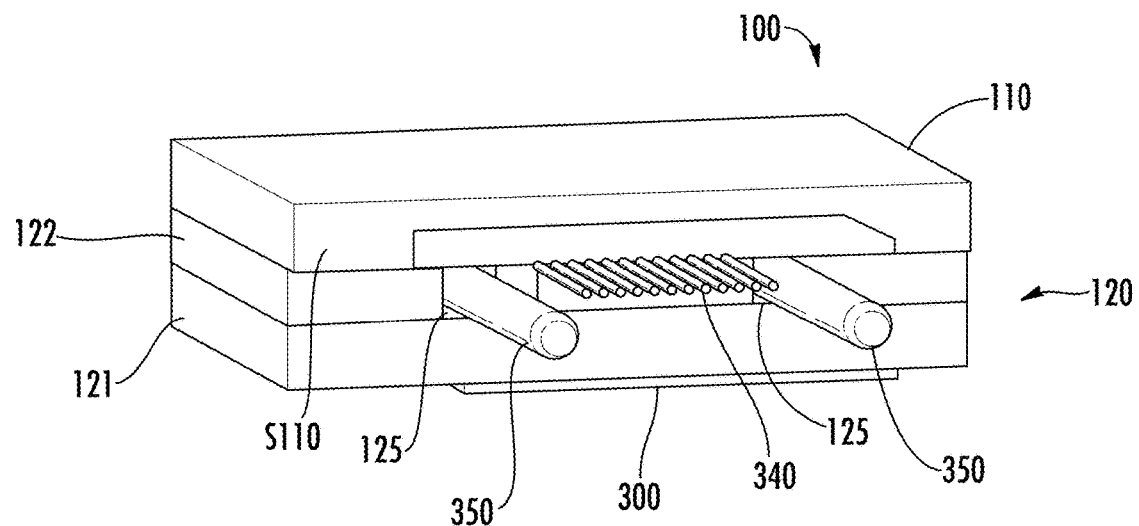
FIG. 15A shows a perspective view of an optical subassembly of an integrated electrical and optoelectronic package.
Figure 15B:
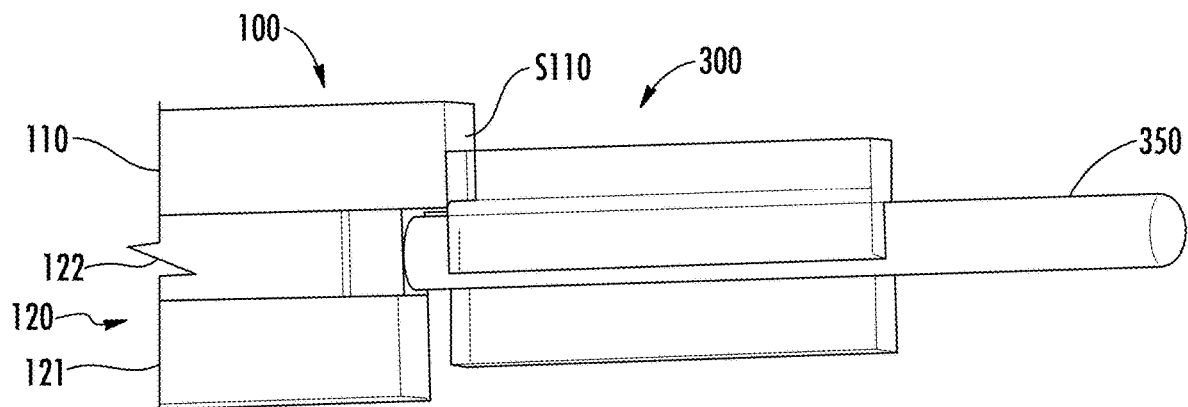
FIG. 15B shows a cross-sectional view of an optical subassembly of an integrated electrical and optoelectronic package.

FIGS. 15A and 15B show a perspective view and a side view of the subassembly of the optical subassembly 100 comprising the stacked arrangement of the spacer substrate 120 with the spacer substrate layers 121 and 122 and the optoelectronic chip 110 mounted thereon and the optical adaptor 300 attached to the end face S110 of the optoelectronic chip 110. The spacer component 122 comprises the cavities 125 to receive the alignment pins 350 of the optical adaptor 300. The alignment pins 350 may be soldered in the cavities 125 of the spacer substrate 120.

At the end face/edge S110 of the optoelectronic chip 110, for example a photonic integrated chip, lasers to emit optical signals and receivers to receive optical signals are designed. As shown in FIGS. 15A and 15B, all the optical waveguides 340 are aligned to the corner arrangement. In order to prevent an (air) gap between the front face S110 of the optoelectronic chip 110 and the optical waveguides 340 of the optical adaptor, the optoelectronic chip 110 is mounted on the stack of the spacer substrate 120 with a projection/overhang, as illustrated in FIG. 15B. The overhang prevents that the optical adaptor abuts on the spacer substrate 120.

Figure 16:
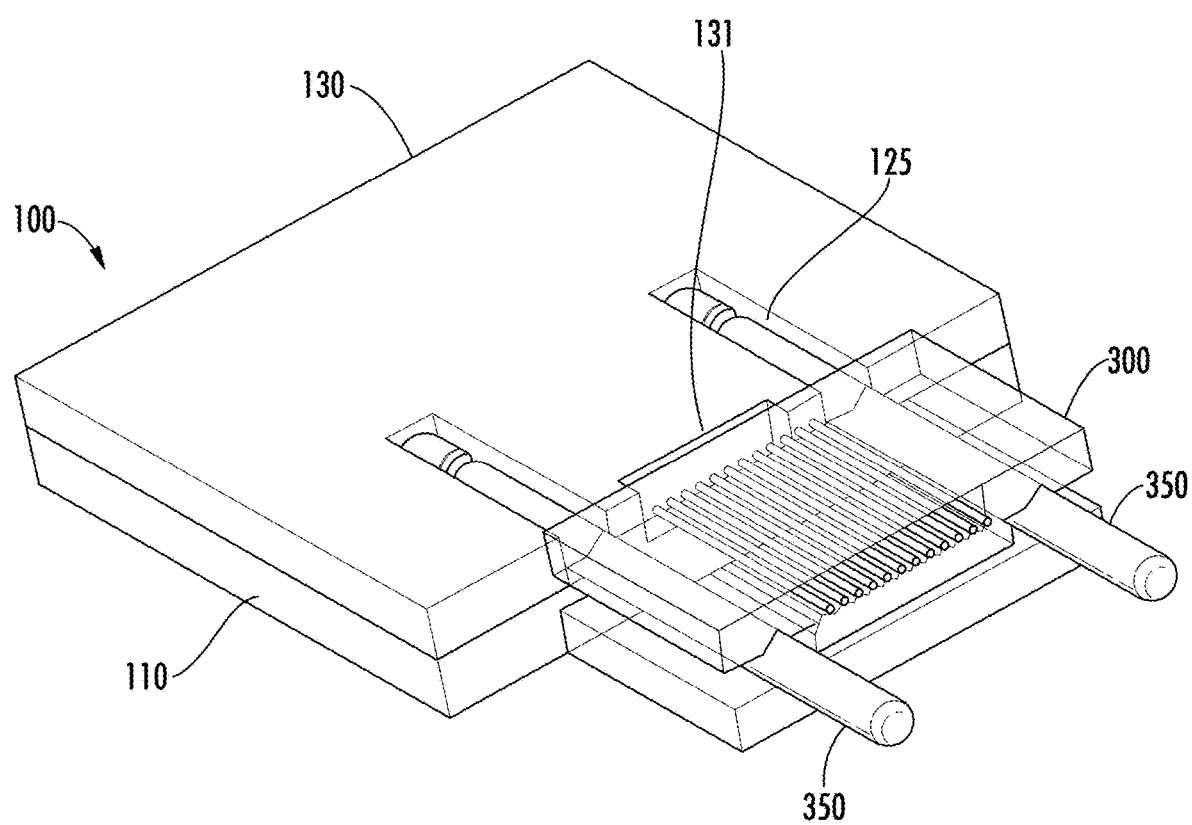
FIG. 16 shows an embodiment of an optical subassembly and an optical adaptor in a mated condition.

FIG. 16 shows an embodiment of the subassembly of the optical subassembly 100, wherein a coupling and alignment layer 130 is arranged on the optoelectronic chip 110. The coupling and alignment layer 130 comprises the cavities 125 to insert the alignment pin 350 of the optical adaptor 300. The alignment pins 350 are positioned, for example, soldered, in the cavities 125 of the coupling and alignment layer 130 which may be configured as a metallized glass transposer. This glass transposer is slightly higher than the pin diameter of the alignment pins 350 to provide a proper pin attachment. The cavities 125 are configured as a symmetric structure of cut-outs in the material of the glass transposer 130 to center the alignment pins of the optical adaptor 300.

Figure 17:
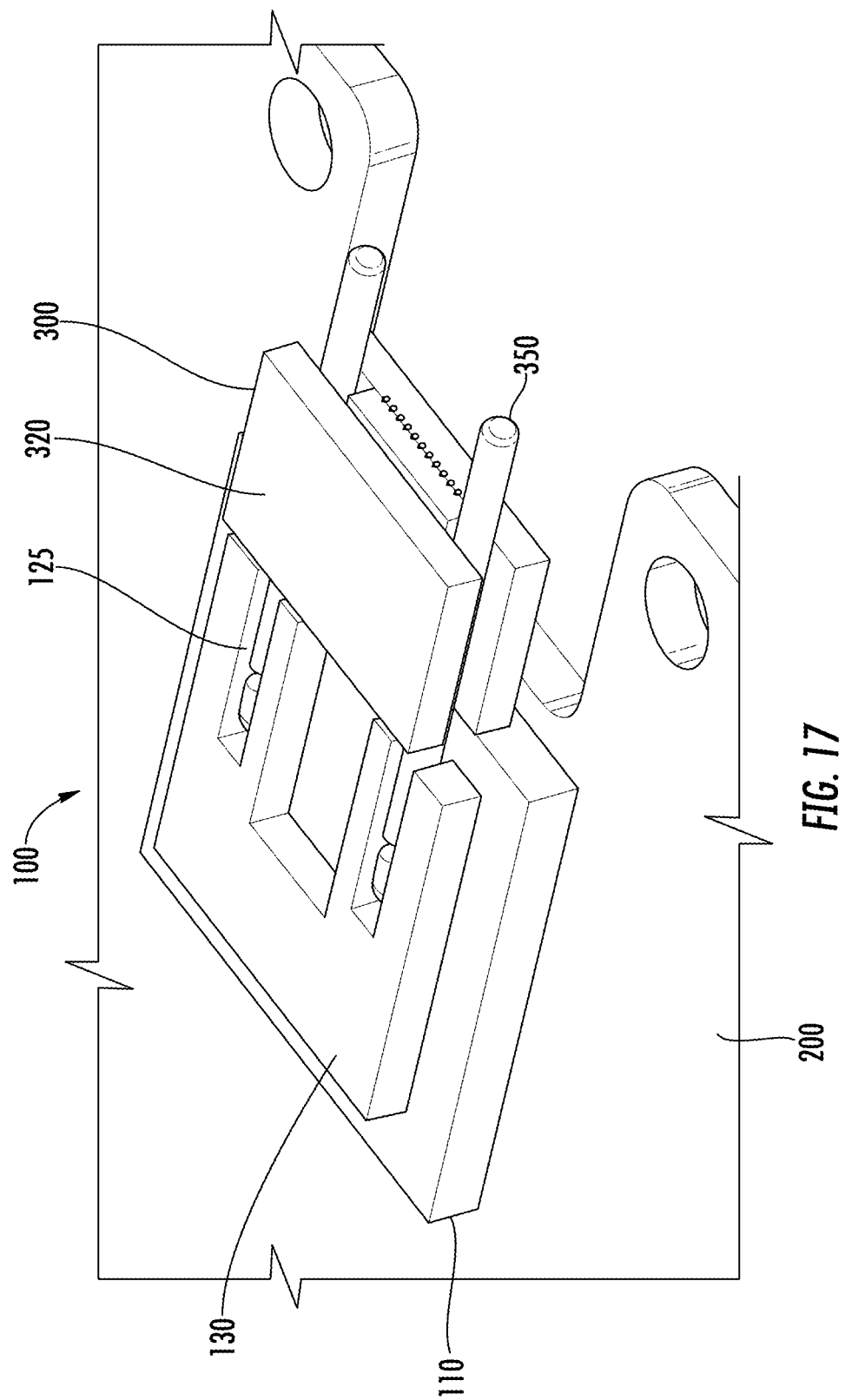
FIG. 17 shows an embodiment of an optical adaptor mounted to an interposer and coupled to an optical adaptor.

FIG. 17 shows an embodiment where the optoelectronic chip 110, for example an integrated photonic chip, is directly bonded to the glass interposer 200. A coupling and alignment layer 130 is mounted on top of the optoelectronic chip 110. The coupling and alignment layer 130 may be configured as a glass plate comprising cavities 125 to align the alignment pins 350 of the optical adaptor 300. In order to couple the optical adaptor of FIG. 13 to the optoelectronic chip 110, the optical adaptor is rotated by 180°. The glass plate 320 may be provided with an overhang and may be fixed, for example glued, with its bottom side to the top surface of the optoelectronic chip 110.

Figure 18:
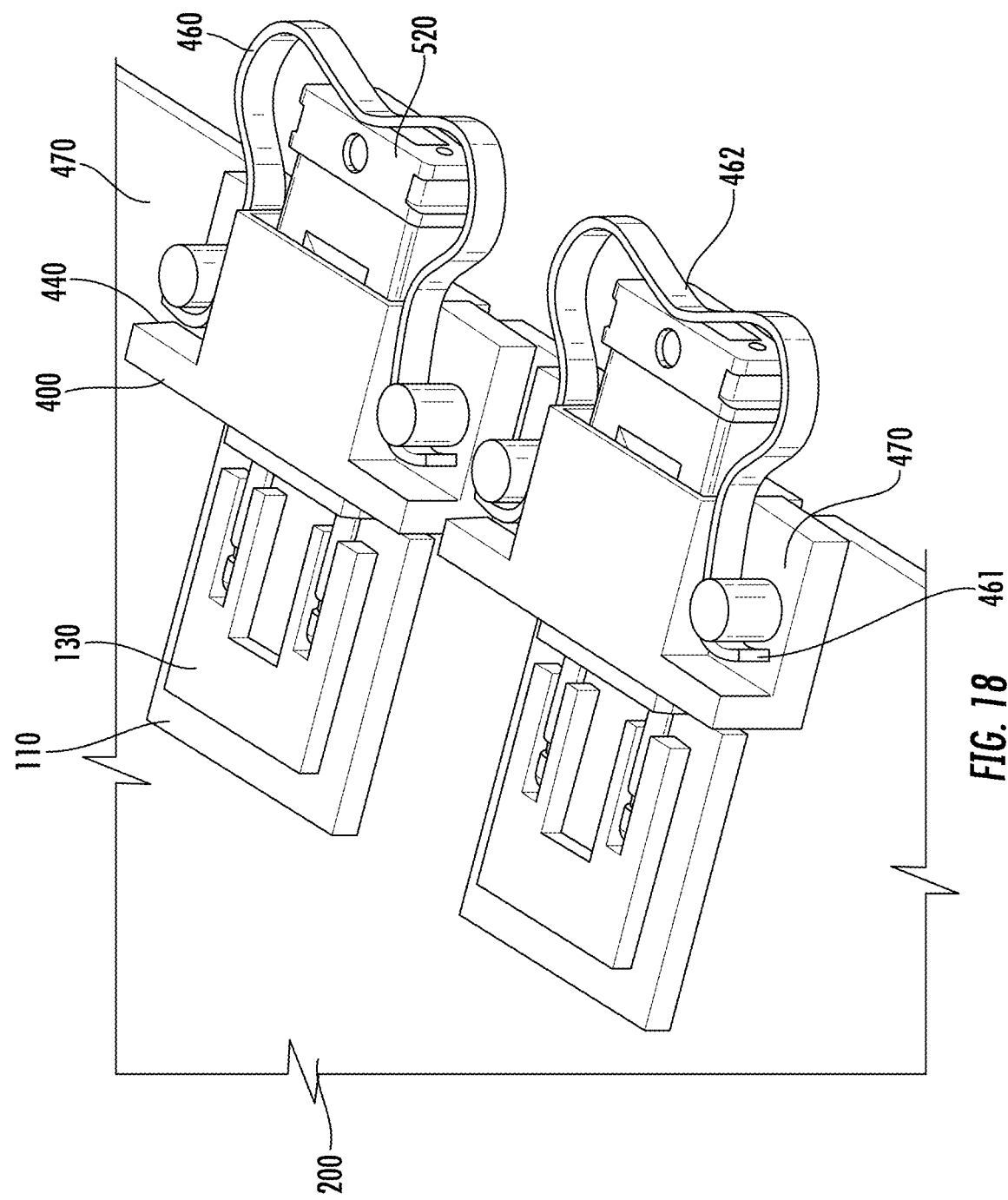
FIG. 18 shows a lateral portion of an integrated electrical and optoelectronic package with an optical connector coupled to the package.

FIG. 18 shows a further embodiment based on the design of the optical subassembly 100 directly arranged on the interposer 200 without using a spacer substrate, as shown in FIG. 17. According to the embodiment shown in FIG. 18, the receptacle housing comprises a spring element 460 having a forward end section 461 fixed to a fixture 470 of the receptacle housing 400 and having a rearward end 462 to exert a force to the ferrule 520. The spring element 460 is integrated in the receptacle housing 400. The receptacle housing 400 is configured as a ferrule holder to receive the ferrule 520 of the optical connector. According to the embodiment shown in FIG. 18, a compression force provided by the spring element 460 can be applied directly in the center of the ferrule 520, for example an MTP ferrule. In this configuration, the connection can be assembled in manufacturing only once.

Figure 19:
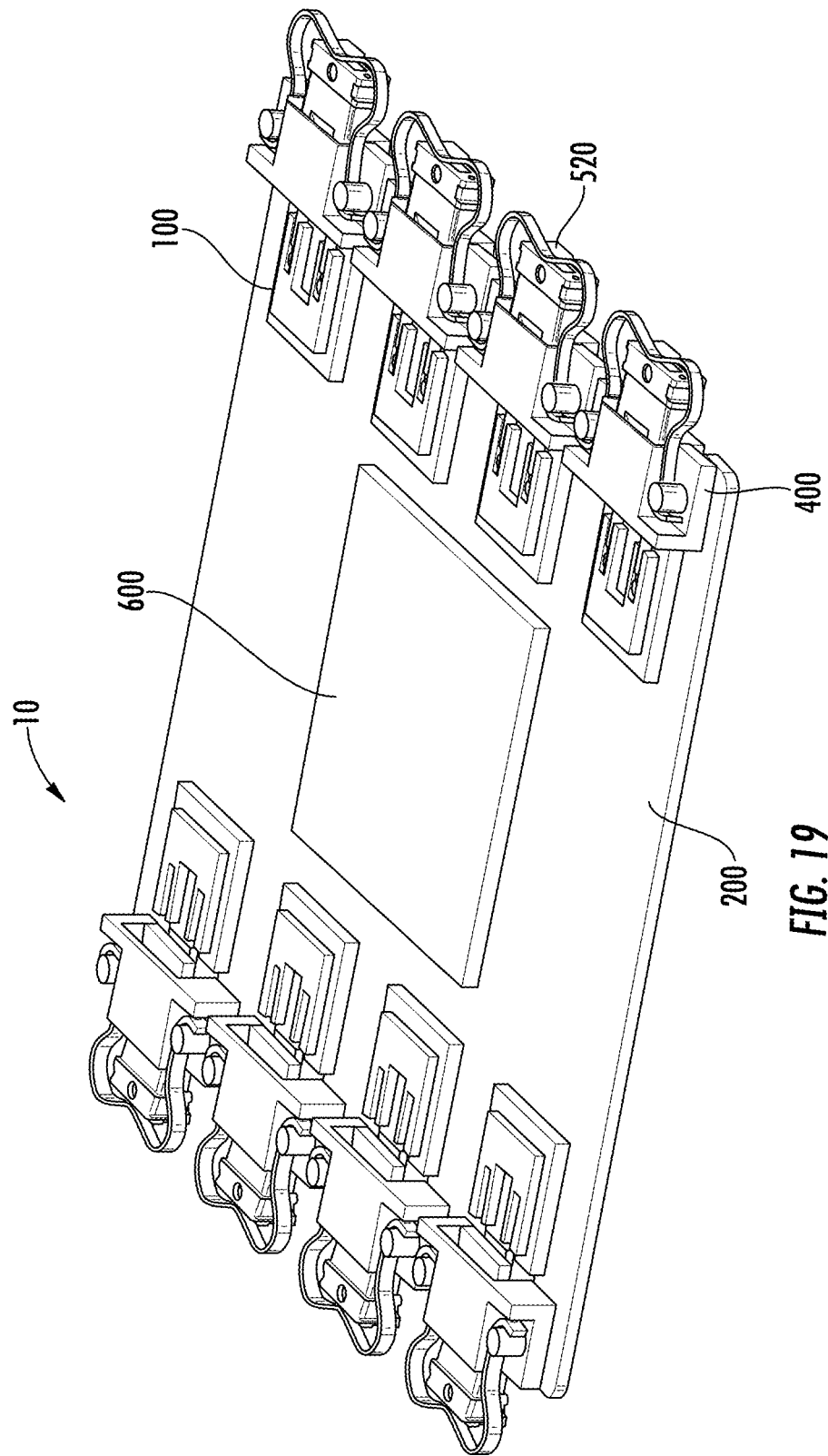
FIG. 19 shows an embodiment of an integrated electrical and optoelectronic package with components mounted on an interposer.

FIG. 19 shows an embodiment of the integrated electrical and optoelectronic package 10 comprising the interposer 200 on which the optical subassemblies 100 and the receptacle housings 400 to receive the optical adaptors and the ferrules 520 of the optical connectors are arranged. The optical subassemblies 100 as well as the receptacle housings 400 are embodied as shown in FIG. 18. The assembly shown in FIG. 19 is not restricted to the embodiment of the optical adaptor 100 and the receptacle housing 400 shown in FIG. 18. The optical subassembly and the receptacle housing may also be embodied, as shown in the previous Figures, for example, as shown in FIG. 8B. After conversion of optical signals into electrical signals, the electrical signals are transferred via transmission paths integrated in the interposer 200 or arranged as conductive layers on the surface of the interposer 200 between the optical subassemblies 100 and the electronic chip 600, for example an ASIC. As shown in FIG. 19, the electronic chip 600 may be arranged in a central position of the interposer 200. The optical subassemblies 100 are arranged along two opposite sides of the interposer 200. Other arrangements of the devices 100, 400 and 600 on the interposer 200 are possible.

FIG. 20 shows the ferrule 520 of an optical connector to be coupled to an optical subassembly 100 via an optical adaptor 300. The ferrule 520 comprises cavities 523 in the front face of the ferrule to insert the alignment pins 350 of the optical adaptor 300. According to the embodiment shown in FIG. 20, a respective center axis of the cavities 523 and a respective center axis of the channels 521 to receive the optical fibers 41 of the optical cable 40 are arranged with an offset to each other in a direction perpendicular to the respective center axis of the cavities 523 and the channels 521. Since the optical waveguides 340 are arranged in the optical adaptor 300 above the alignment pins 350, the configuration of the ferrule 520 shown in FIG. 20 allows to optically couple the optical fibers 41 arranged in the channels 521 of the ferrule 520 to the optical waveguides 340 of the optical adaptor 300, when the alignment pins 350 are inserted in the cavities 523 of the ferrule 520.

Figure 21A:
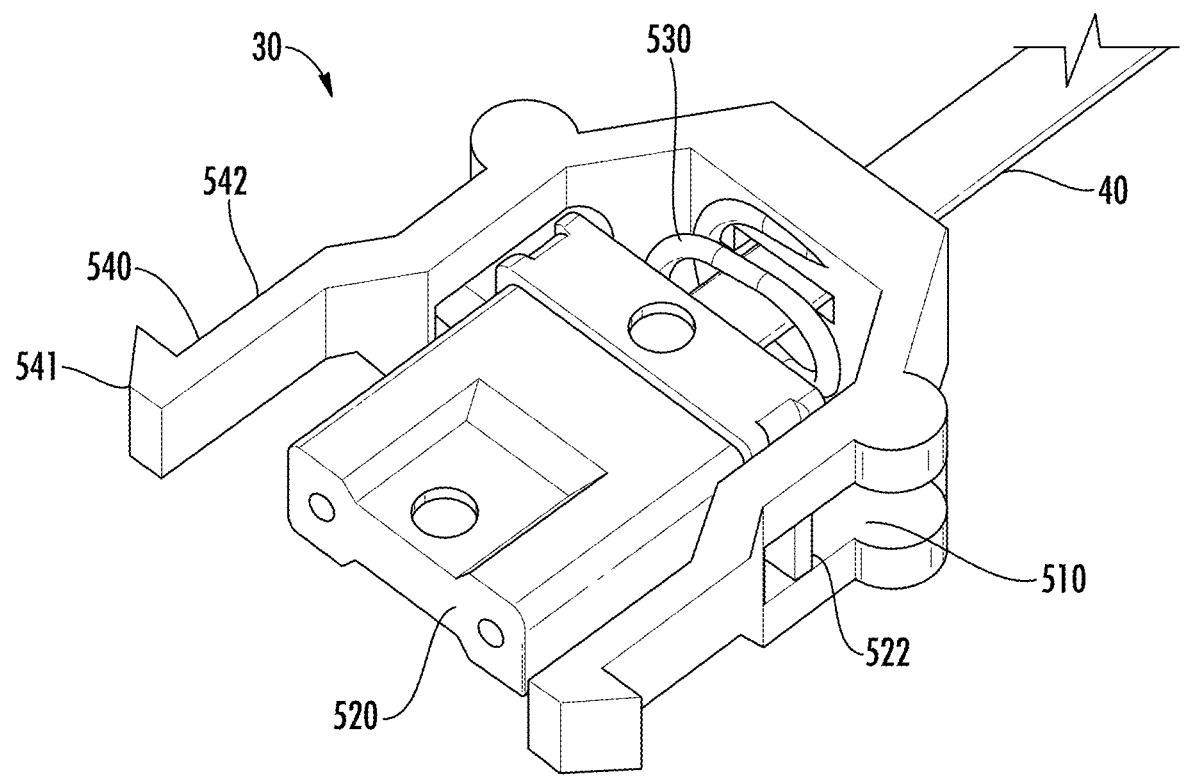
FIG. 21A shows an embodiment of an optical connector to be connected to an integrated electrical and optoelectronic package.

FIG. 21A shows an embodiment of an optical connector 30 comprising the ferrule 520 with the protrusions 522 being arranged in guiding slots 510 of the body 500 of the optical connector 30. In contrast to the embodiment of the optical connector 30 shown in FIG. 9, the body 500 of the optical connector 30 shown in FIG. 21A has a U-shaped design with snap hooks 541 that are directed to the outside, whereas the snap hooks of the engagement element of the optical connector shown in FIG. 9 are directed to the inside. The optical connector 30 of FIG. 21A is configured to be secured to an embodiment of a receptacle housing 400 shown in FIG. 21B.

Figure 21B:
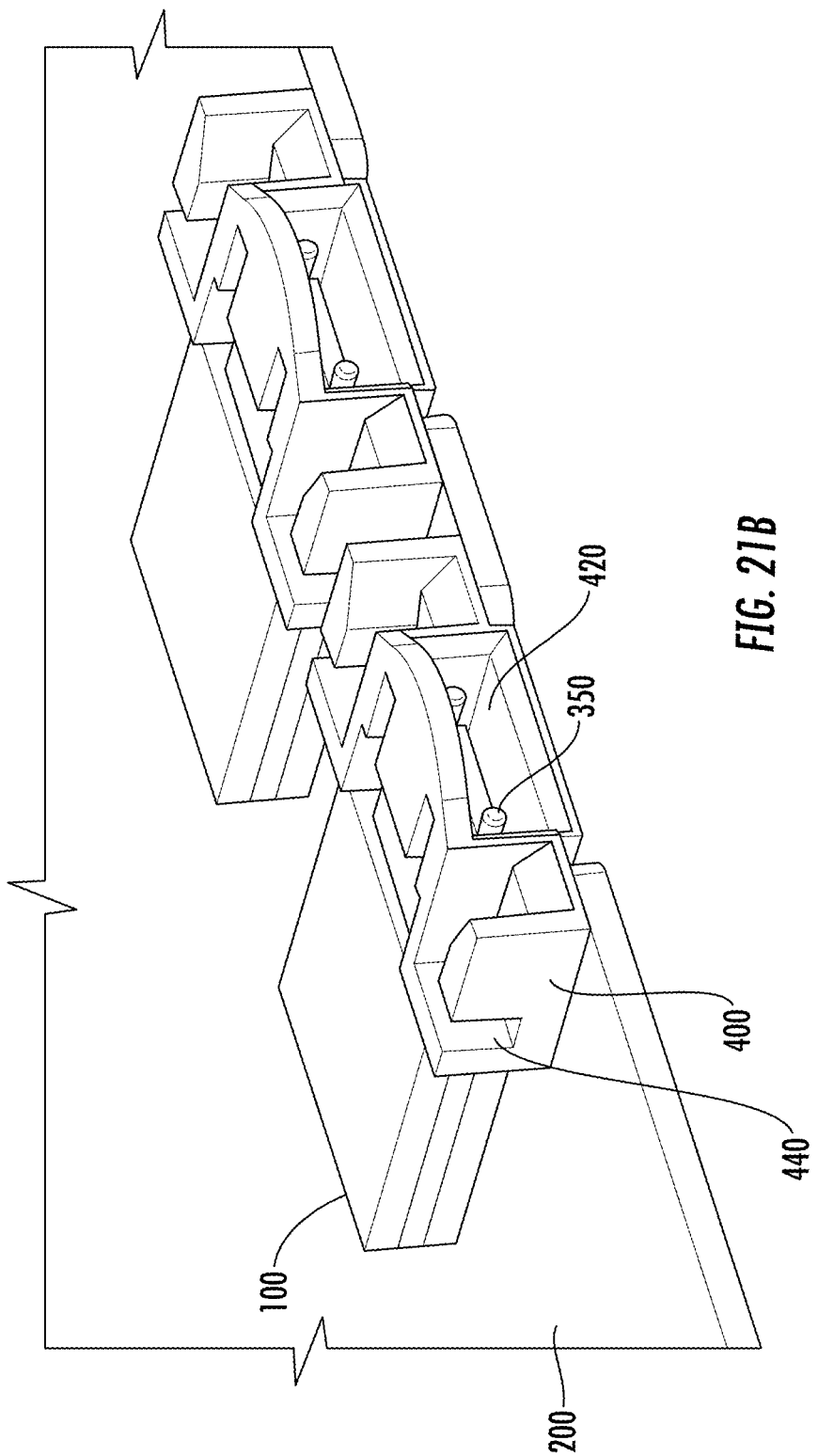
FIG. 21B shows a perspective view of an embodiment of a receptacle housing, an optical adaptor and an optical subassembly of an integrated electrical and optoelectronic package.

According to the design of the optical connector 30 of FIG. 21A, the snap hooks 541 can be engaged/unlocked from an engagement structure 440 of a receptacle housing 400, as shown in FIG. 21B, by pressing the U-shaped engaging arms 542 of the body 500 together. Due to the design of the engagement element 540 the width of the receptacle housing 400 shown in FIG. 21B is slightly wider than the width of the embodiment of the receptacle housing 400 shown in FIGS. 8A and 8B. The receptacle housing 400 shown in FIG. 21B offers an additional feature by extending the top portion/wall 423 of the tunnel 420 to the front for identifying the location of the port from a top perspective.

Figure 21C:
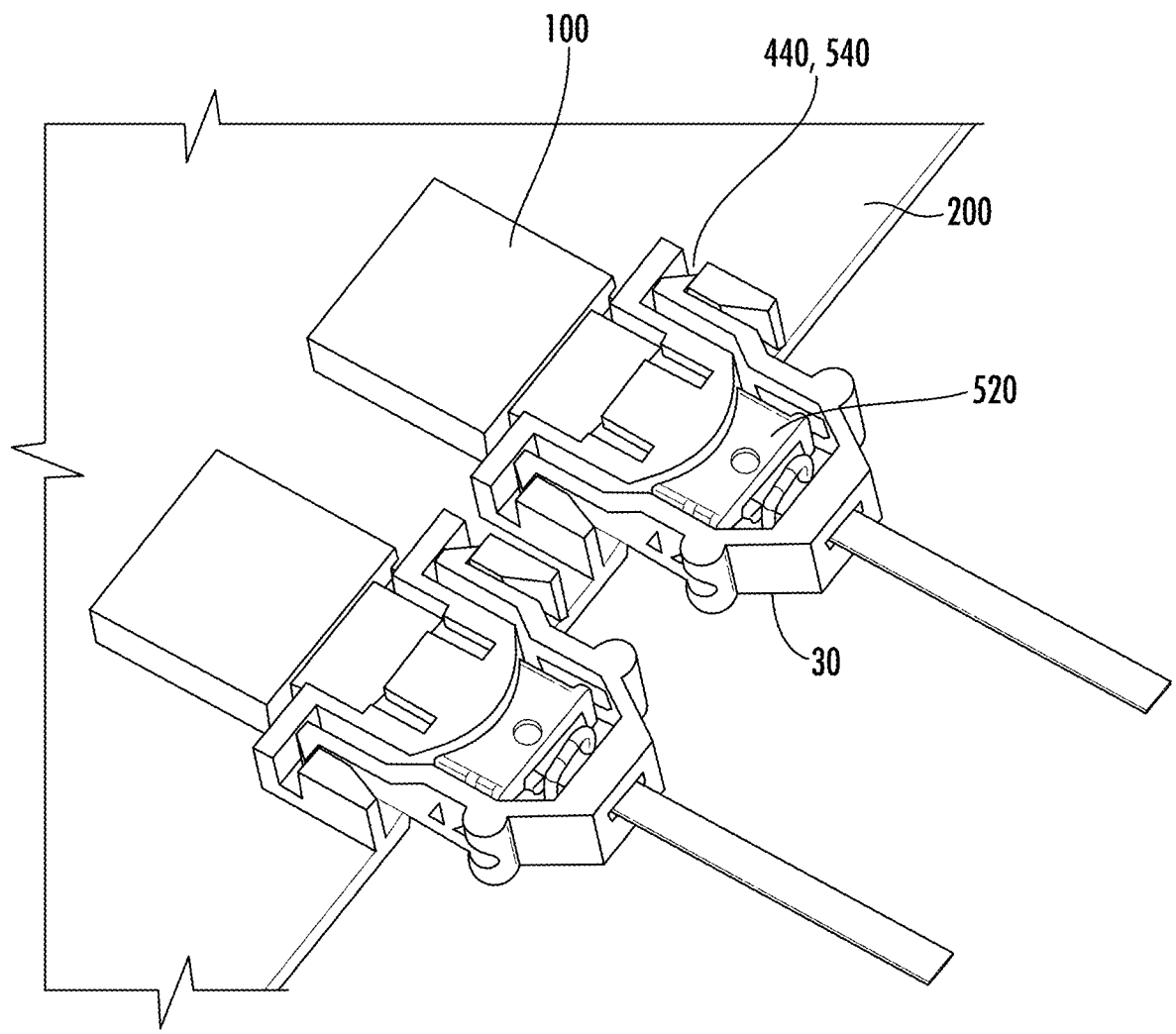
FIG. 21C shows an embodiment of an assembly comprising optical connectors mechanically coupled to an integrated electrical and optoelectronic package.

FIG. 21C shows the alternative optical connection using the optical connector 30 of FIG. 21A and the receptacle housing 400 of FIG. 21B. The configuration shown in FIGS. 21A to 21C is designed for automation processes. An advantage is that both snap hooks 541 need to be pressed against the walls of the receptacle housing 400 and thus cannot be engaged accidentally.

Figure 22A:
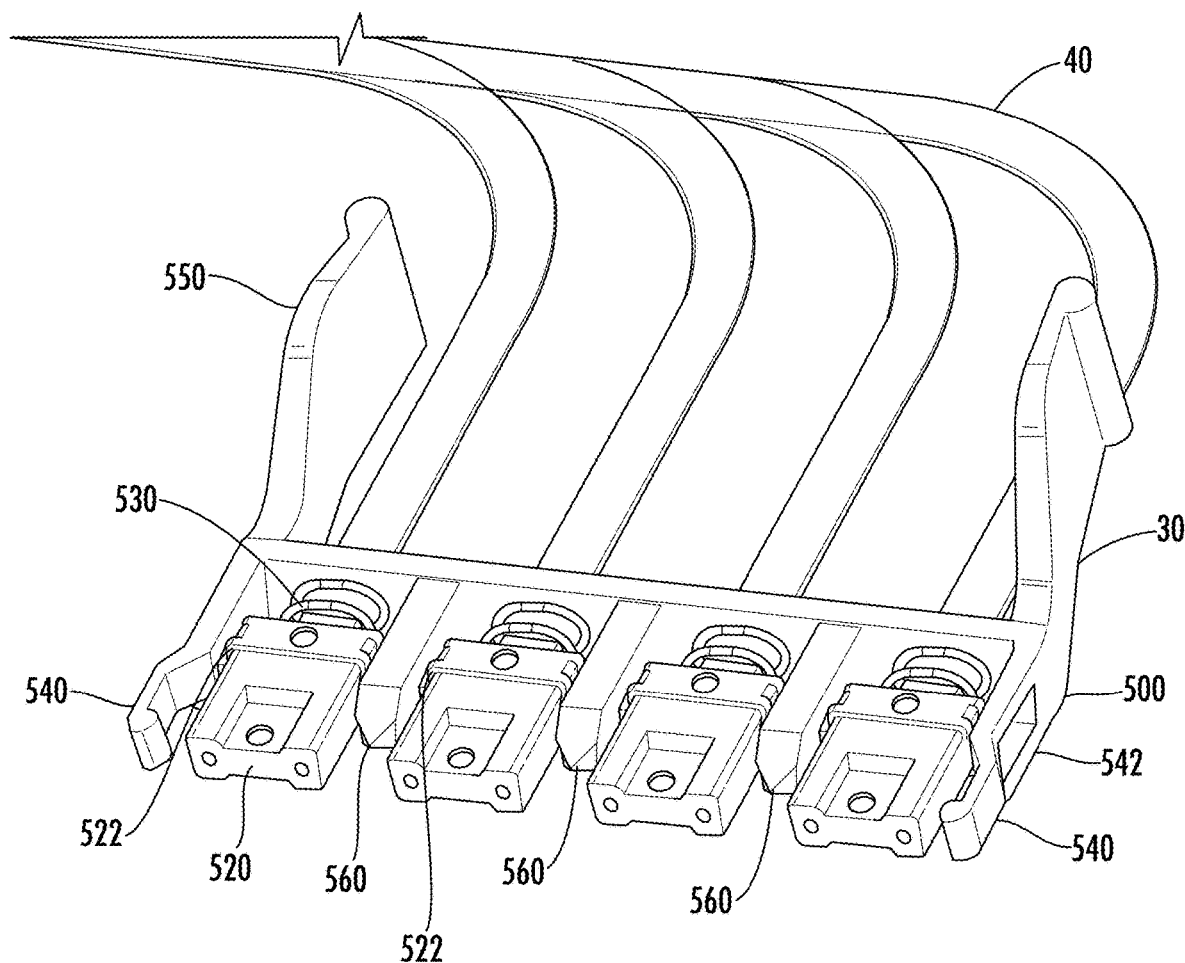
FIG. 22A shows a perspective view of a ganged optical connector with four ferrules.

FIG. 22A shows a perspective view of a multiple-ganged connector principle of the optical connector 30 in an unmated condition. The connector is designed as a four-ganged connector. The optical connector 30 comprises four ferrules 420 that are arranged adjacent to each other in the body 500 of the optical connector between the arms 542 of the engagement element 540. The optical connector comprises pins 560 for holding the ferrules 520 between the arms 542. The ferrules 520 are movably arranged between the pins 560 or between one of the pins and one of the outer arms 542 of the engagement element 540 by means of the protrusions 522 of the ferrules, as described above. Each ferrule 520 is spring-loaded by a respective spring element 530.

Figure 22B:
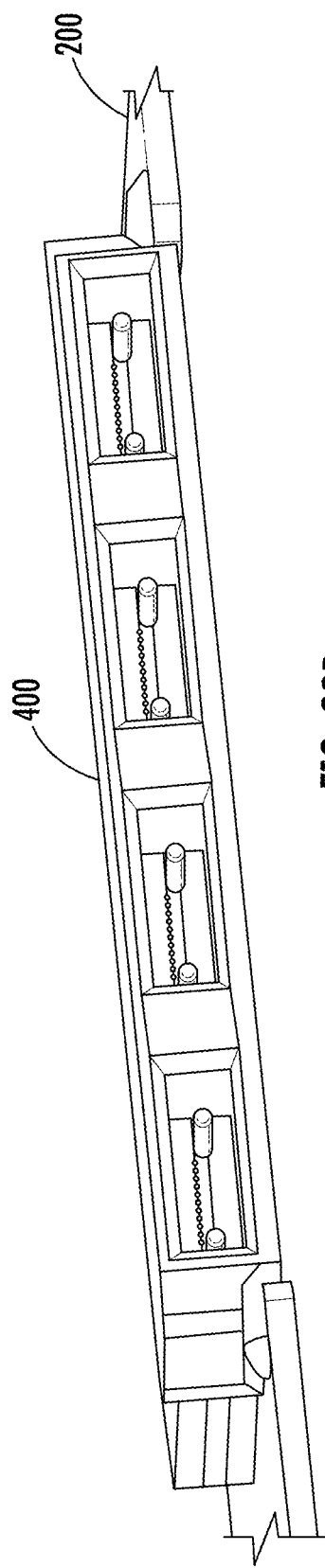
FIG. 22B shows a ganged optical subassembly and receptacle housing mounted on an interposer.

FIG. 22B shows a perspective view of a corresponding multiple-ganged receptacle housing 400 in an unmated condition. The receptacle housing is configured as a four-ganged receptacle housing to receive the ferrules 520 of the four-ganged optical connector 30 of FIG. 22A. The slots/tunnels 440 may be configured to provide keying and prealignment of the optical connector 30.

Figure 22C:
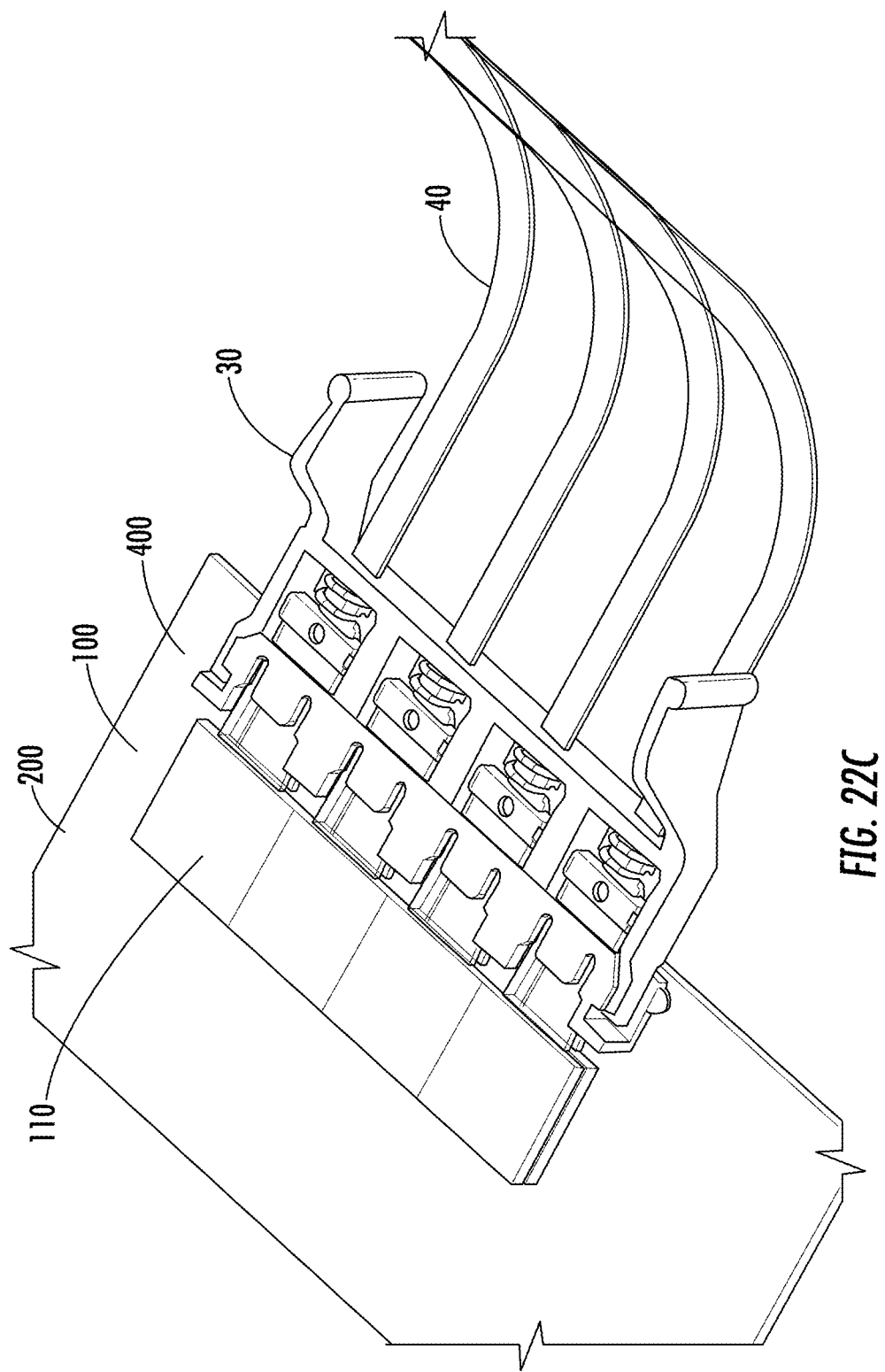
FIG. 22C shows a ganged optical connector mechanically coupled to a ganged receptacle housing of an integrated electrical and optoelectronic package.

FIG. 22C shows a perspective view of the multiple-ganged connector principle in a mated condition. The optical connector 30 with the ferrules 520 is inserted in the tunnels/slots of the receptacle housing 400.

The configuration shown in FIGS. 22A to 22C is suited to overcome higher density and speed requirements by mounting multiple ferrules 520, for example MTP ferrules, to one body 500 of an optical connector. The optical subassemblies 100 with the optoelectronic chips 110 are put side-to-side into a row on the interposer 200. Instead of using a single spacer substrate or glass transposer, the optical subassemblies 100 can be combined together in two or more substrate layers. That would reduce the alignment process of each individual optical subassembly 100 to the glass interposer 200. The snap hook locking needs to be adjusted due to the increasing applied compression force in the ganged connector. Therefore, the receptacle housing mechanical coupling needs to be improved on the glass interposer.

What is claimed is:

1. An optical subassembly for the conversion of data between an optical and electrical format, comprising:
a first side to transmit and receive the data in the optical format;
a second side to transmit and receive the data in the electrical format;
an optoelectronic chip to change a data format of the data between the optical and electrical format, wherein the optoelectronic chip comprises optical waveguides;
a spacer substrate comprising metallized through-glass-vias; and
an optical adaptor comprising optical waveguides for transferring light between optical fibers of an optical cable and the optical waveguides of the optoelectronic chip, wherein the optical adaptor comprises at least one alignment pin, and the spacer substrate comprises at least one cavity to receive the at least one alignment pin to optically couple the optical fibers of the optical adaptor to the optical waveguides of the optoelectronic chip.

2. The optical subassembly of claim 1, the spacer substrate comprising a top side to mount the optoelectronic chip onto the spacer substrate and having a bottom side to be mountable to a supporting substrate, the bottom side of the spacer substrate being configured as the second side of the optical subassembly, wherein the spacer substrate is configured to provide the optoelectronic chip at a distance to the supporting substrate, when the optical subassembly is mounted to the supporting substrate.

3. The optical subassembly of claim 1, wherein the spacer substrate comprises glass.

4. The optical subassembly of claim 1, wherein the spacer substrate comprises a glass transposer.

5. The optical subassembly of claim 1, wherein the optical waveguides of the optical adaptor are optical fibers or planar waveguides.

6. The optical subassembly of claim 1, further comprising a coupling and alignment layer comprising the at least one cavity to mechanically couple the optical adaptor to the optoelectronic chip and to align the optical waveguides of the optical adaptor to the optical waveguides of the optoelectronic chip, wherein the coupling and alignment layer is arranged on the optoelectronic chip.

7. The optical subassembly of claim 1, wherein the spacer substrate comprises a first spacer component and at least a second spacer component, the first spacer component is configured to be mountable to the supporting substrate, and the at least one second spacer component comprises the at least one cavity to receive the at least one alignment pin.

8. The optical subassembly of claim 7, wherein the at least one second spacer component is mounted between the optoelectronic chip and the first spacer component.

9. The optical subassembly of claim 1, wherein the optoelectronic chip is mounted to the spacer substrate such that a side face of the optoelectronic chip being directed to the optical adaptor projects beyond the spacer substrate.

10. The optical subassembly of claim 1, wherein the at least one alignment pin has a first portion projecting out of the optical adaptor at a first side of the optical adaptor to align the optical waveguides of the optoelectronic chip and the optical waveguides of the optical adaptor to transfer light between the optical adaptor and the optoelectronic chip, and the at least one alignment pin has a second portion projecting out of the optical adaptor at a second side of the optical adaptor to align the optical waveguides of the optical cable and the optical fibers of the optical adaptor to transfer light between the optical adapter and the optical cable.

11. The optical subassembly of claim 1, wherein the optical adaptor further comprises a first glass plate comprising at least one first groove to receive the at least one alignment pin, and a second glass plate being arranged below the first glass plate such that the at least one alignment pin is fixed between the first and the second glass plate.

12. The optical subassembly of claim 11, wherein the first glass plate of the optical adaptor comprises a plurality of second grooves, wherein each of the plurality of the second grooves is configured to receive one of the plurality of the optical fibers of the optical adaptor.

13. The optical subassembly of claim 12, wherein a center axis of the at least one alignment pin and a respective center axis of the plurality of the optical fibers of the optical adaptor are arranged with an offset to each other in a direction perpendicular to the respective center axis of the at least one alignment pin and the plurality of the optical fibers of the optical adaptor.

14. The optical subassembly of claim 11, further comprising a third glass plate being arranged on a surface of the first glass plate directed to the second glass plate, wherein the plurality of optical fibers of the optical adaptor are covered by the third glass plate.

15. The optical subassembly of claim 14, wherein the third glass plate has a plurality of grooves being respectively separated by a flat surface portion of the third glass plate, and the third glass plate is arranged on the surface of the first glass plate such that the optical fibers of the optical adaptor are covered by the flat surface portions of the third glass plate.

16. The optical subassembly of claim 11, wherein the at least one alignment pin is fixed in the at least one first groove and the plurality of the optical fibers are fixed in the second grooves of the first glass plate by means of an adhesive.

17. An integrated electrical and optoelectronic package, comprising:
an optical subassembly for the conversion of data between an optical and electrical format of claim 1;
an electronic chip including an integrated electric circuit for processing the data in the electrical format;
an interposer being configured as a supporting substrate to support the optical subassembly and the electronic chip, the interposer being configured to provide data transmissions paths for the transmission of the data in the electrical format between the optical subassembly and the electronic chip.

18. The integrated electrical and optoelectronic package of claim 17, further comprising a receptacle housing to house the optical adaptor of the optical subassembly and an optical connector terminating the optical cable, the receptacle housing comprising a body having a tunnel to receive the optical connector at a first side of the tunnel and to receive an optical adaptor of the optical subassembly as an interface between the optoelectronic chip and the optical connector at a second side of the tunnel, wherein the body has at least one slot allowing at least one alignment pin of the optical adaptor to pass-through and align the optical adaptor and the optical connector in the tunnel.

19. The integrated electrical and optoelectronic package of claim 18, wherein the interposer has a cut-out region to receive the receptacle housing such that the bottom portion of the tunnel of the receptacle housing is arranged in the cut-out region of the interposer.

20. The integrated electrical and optoelectronic package of claim 18, wherein the interposer has at least one hole to receive the at least one pin of the receptacle housing to secure the receptacle housing on the interposer by a pin-hole connection.

21. The integrated electrical and optoelectronic package of claim 18, wherein the optical adaptor is mechanically coupled to the optoelectronic chip and the optical waveguides of the optical adaptor are aligned to the optical waveguides of the optoelectronic chip by the first portion of the at least one alignment pin of the optical adaptor being inserted in the at least one cavity of the optical subassembly, and wherein the optical adaptor is mechanically coupled to the receptacle housing by the second portion of the at least one alignment pin of the optical adaptor being inserted in the at least one slot of the receptacle housing.

22. The integrated electrical and optoelectronic package of claim 17, wherein the interposer comprises a conductive layer to provide the data transmissions paths for the transmission of the data in the electrical format between the optoelectronic chip and the electronic chip, and the optoelectronic chip is wire bonded to the conductive layer of the interposer.

23. The integrated electrical and optoelectronic package of claim 17, wherein the interposer comprises a conductive layer to provide the data transmissions paths for the transmission of the data in the electrical format between the optoelectronic chip and the electronic chip, and the optoelectronic chip is flip-chip mounted on the spacer substrate and is electrically connected to the conductive layer of the interposer by the metalized through-glass-vias of the spacer substrate.

24. The integrated electrical and optoelectronic package of claim 17, further comprising a covering element, wherein the covering element is arranged above the electronic chip and the optical subassembly and the receptacle housing; and
a heat spreader being arranged on the covering element.

25. The integrated electrical and optoelectronic package of claim 17, wherein the interposer has an upper surface on which the electronic chip, the optical subassembly and the receptacle housing are arranged, and the interposer comprises connection elements to electrically and mechanically connect the interposer to a printed circuit board, the connection elements being arranged on a lower surface of the interposer.

26. The integrated electrical and optoelectronic package of claim 17, wherein the interposer comprises a glass or a glass ceramic.

27. The integrated electrical and optoelectronic package of claim 17, wherein the interposer comprises at least one receptacle housing per 100 millimeters of the interposer.

28. The integrated electrical and optoelectronic package of claim 17, wherein the interposer comprises at least one optical subassembly per 2500 square millimeters of the interposer.

* * * * *